(12) United States Patent
Zhang et al.

(10) Patent No.: US 12,322,975 B2
(45) Date of Patent: Jun. 3, 2025

(54) ENERGY STORAGE SYSTEM AND PHOTOVOLTAIC ENERGY STORAGE SYSTEM

(71) Applicant: Huawei Digital Power Technologies Co., Ltd., Shenzhen (CN)

(72) Inventors: Yanzhong Zhang, Shenzhen (CN); Xun Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/397,752

(22) Filed: Dec. 27, 2023

(65) Prior Publication Data
US 2024/0128763 A1    Apr. 18, 2024

Related U.S. Application Data

(63) Continuation of application No. 17/478,561, filed on Sep. 17, 2021, now Pat. No. 11,909,217, which is a
(Continued)

(30) Foreign Application Priority Data

Jan. 23, 2020   (CN) .......................... 202010076994.0

(51) Int. Cl.
*H02J 3/32* (2006.01)
*H02J 3/34* (2006.01)
(Continued)

(52) U.S. Cl.
CPC .................................. *H02J 3/46* (2013.01);
*H02J 3/32* (2013.01); *H02J 3/34* (2013.01);
*H02J 3/381* (2013.01);
(Continued)

(58) Field of Classification Search
CPC ........ H02J 3/46; H02J 3/32; H02J 3/34; H02J 3/381; H02J 7/0016; H02J 7/0047;
(Continued)

(56) References Cited

U.S. PATENT DOCUMENTS

| | | | |
|---|---|---|---|
| 9,397,504 B1 * | 7/2016 | Narla | ........................ H02S 40/38 |
| 2006/0006850 A1 * | 1/2006 | Inoue | ................ H02J 7/007182 |
| | | | 323/265 |

(Continued)

FOREIGN PATENT DOCUMENTS

| CN | 202364144 A | 8/2012 |
|---|---|---|
| CN | 103337869 A | 10/2013 |

(Continued)

OTHER PUBLICATIONS

Yi et al., "Research on Two-Stage PV Grid-Tied Inverter With By-Pass Relay," Journal of Electrical Engineering, vol. 11 No. 12, China Academic Journal Electronic Publishing House, Total 6 pages (Dec. 2016). With an English abstract.

*Primary Examiner* — Elim Ortiz
(74) *Attorney, Agent, or Firm* — Leydig, Voit & Mayer, Ltd.

(57) ABSTRACT

The present disclosure discloses an energy storage converter, wherein a first end of the energy storage converter is coupled to at least one of the Q cell strings, and second end of the energy storage converter is configured to connect to a power grid. The first energy storage converter includes a DC/AC conversion unit and at least one DC/DC conversion unit. The DC/DC conversion unit is configured to perform adaptation between a voltage of the DC/AC conversion unit and a voltage of a cell string. Therefore, a cell capacity is fully used, and a waste of the cell capacity is reduced.

14 Claims, 15 Drawing Sheets

Related U.S. Application Data continuation of application No. PCT/CN2021/072818, filed on Jan. 20, 2021.

(51) Int. Cl.
- *H02J 3/38* (2006.01)
- *H02J 3/46* (2006.01)
- *H02J 7/00* (2006.01)

(52) U.S. Cl.
CPC .......... *H02J 7/0016* (2013.01); *H02J 7/0047* (2013.01); *H02J 2300/24* (2020.01)

(58) Field of Classification Search
CPC .. H02J 2300/24; H02J 2207/20; H02J 7/0019; H02J 7/02; H02J 7/35; Y02E 10/56; Y02E 70/30; H02S 10/20
USPC ..... 307/43, 52, 66, 71, 77, 80, 82; 320/101; 363/71; 136/244
See application file for complete search history.

(56) References Cited

U.S. PATENT DOCUMENTS

| | | | |
|---|---|---|---|
| 2009/0315404 A1* | 12/2009 | Cramer | H02J 3/381 307/82 |
| 2015/0229268 A1* | 8/2015 | Satake | H02J 13/00034 136/244 |
| 2018/0037121 A1 | 2/2018 | Narla | |

FOREIGN PATENT DOCUMENTS

| | | |
|---|---|---|
| CN | 204243781 U | 4/2015 |
| CN | 106953538 A | 7/2017 |
| CN | 107919809 A | 4/2018 |
| CN | 108092601 A | 5/2018 |
| CN | 110061515 A | 7/2019 |
| WO | 2015092441 A2 | 6/2015 |

* cited by examiner

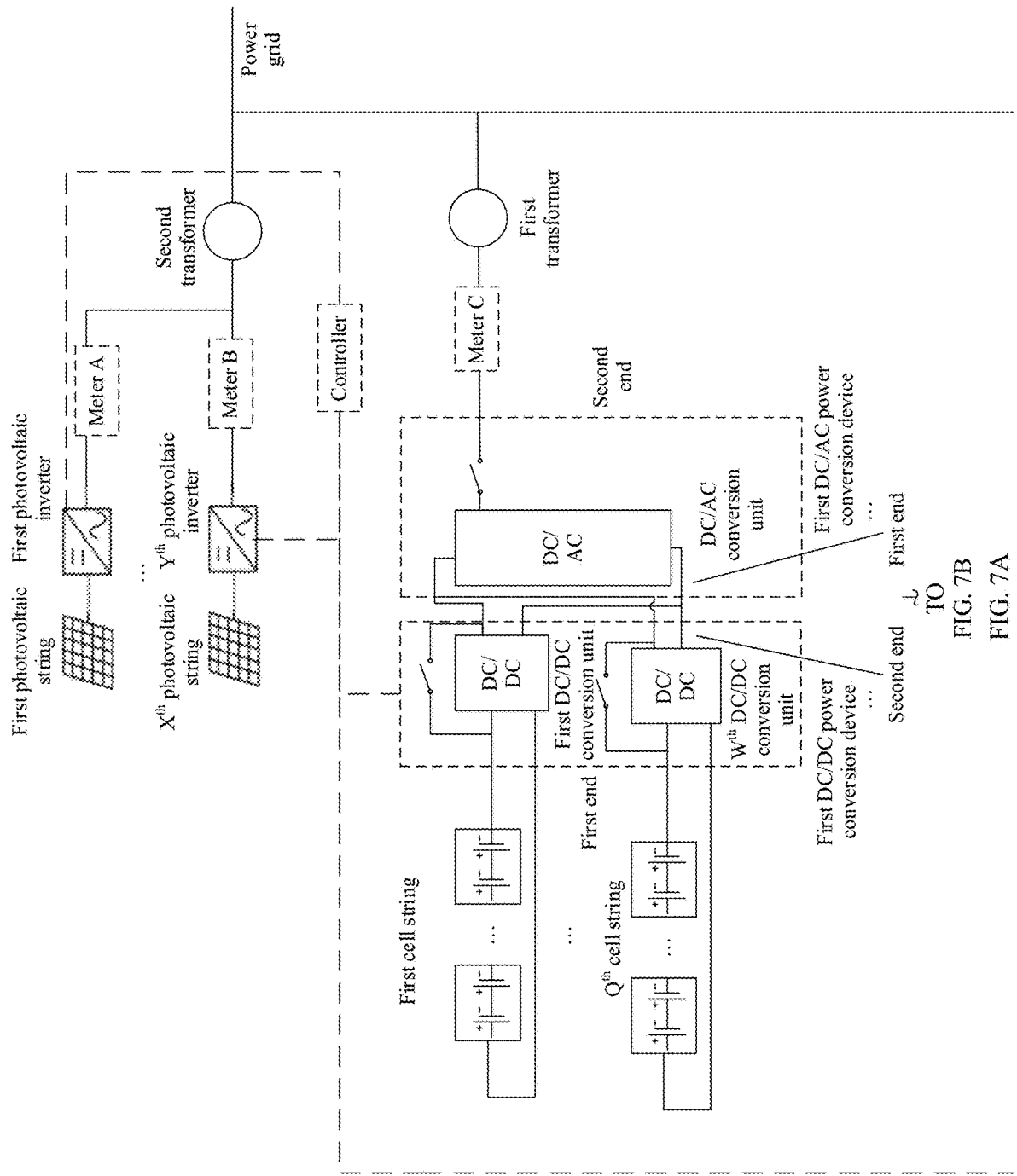

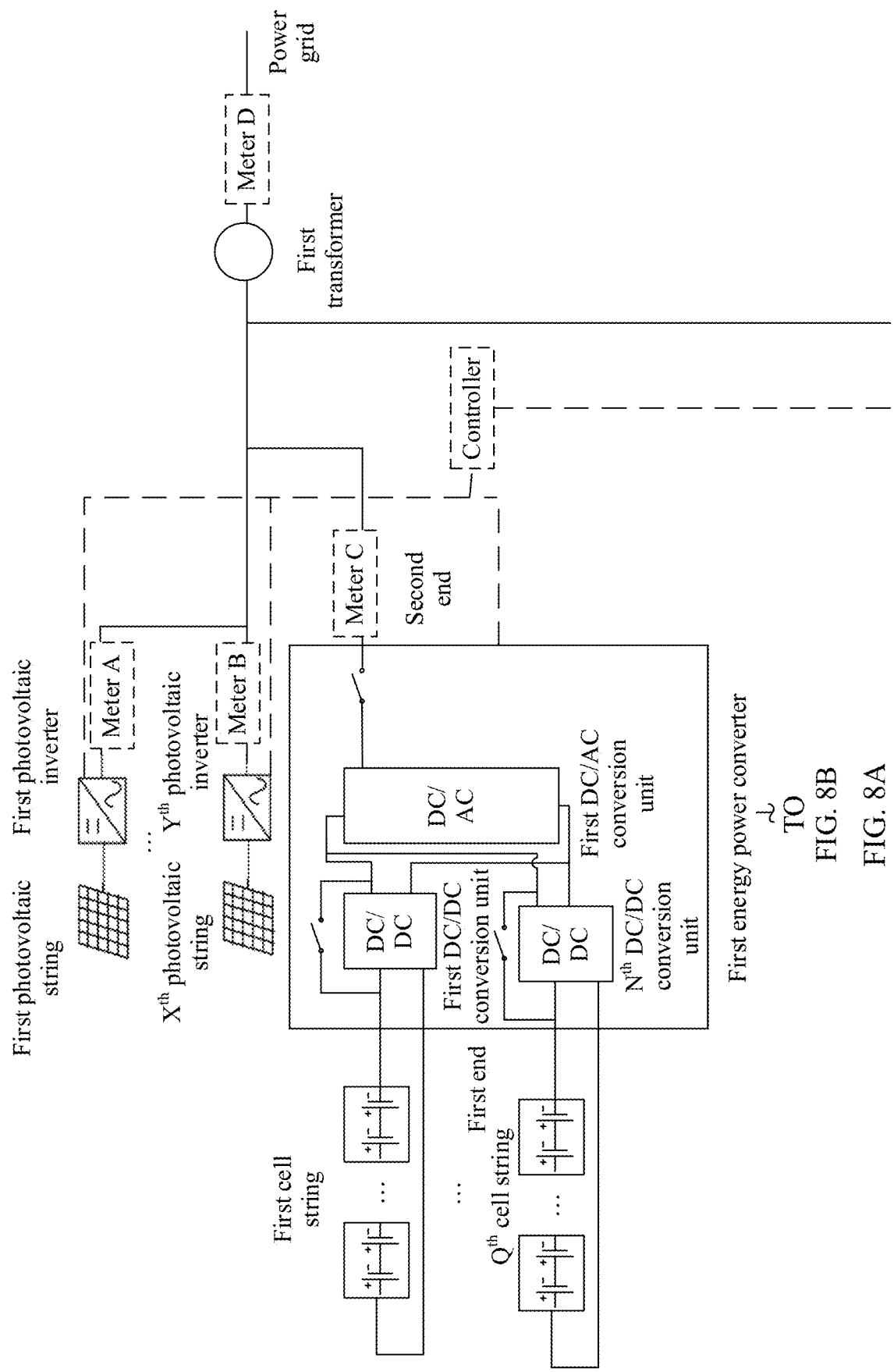

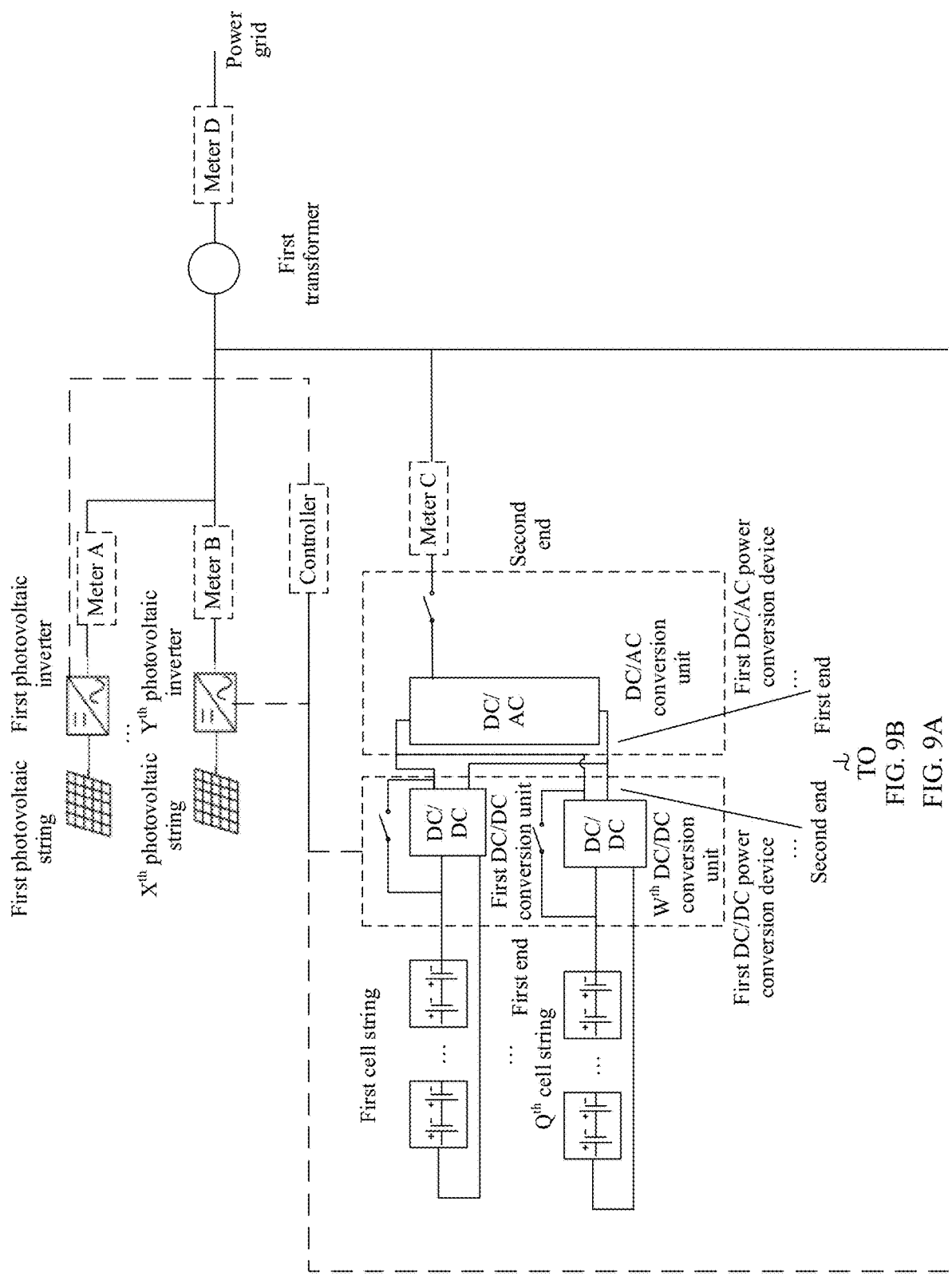

ENERGY STORAGE SYSTEM AND PHOTOVOLTAIC ENERGY STORAGE SYSTEM

CROSS-REFERENCE TO RELATED APPLICATIONS

This application is a continuation of U.S. patent application Ser. No. 17/478,561, filed on Sep. 17, 2021, which is a continuation of International Application No. PCT/CN2021/072818, filed on Jan. 20, 2021, which claims priority to Chinese Patent Application No. 202010076994.0, filed on Jan. 23, 2020. All of the afore-mentioned patent applications are hereby incorporated by reference in their entireties.

TECHNICAL FIELD

The present disclosure relates to the field of electricity, and in particular, to an energy storage system and a photovoltaic energy storage system.

BACKGROUND

As a clean renewable energy source, photovoltaic power generation is widely applied. However, the application of photovoltaic power generation also has disadvantages. Main problems of photovoltaic power generation are unpredictability and volatility of output power. As a proportion of photovoltaic power generation in a conventional power grid becomes increasingly larger, a high penetration rate of photovoltaic power generation brings quite large impact on the power grid, and brings a series of problems to voltage stability, electric energy quality, and operation control of the power grid.

Currently, an energy storage apparatus may be added to a photovoltaic power generation system, and using a charging/discharging feature of the energy storage apparatus can well resolve the problems of unpredictability and volatility of output power of a photovoltaic power station that are caused by uneven light exposure. In addition, photovoltaic power curtailment phenomena of photovoltaic power generation can be reduced, large-scale consumption of photovoltaic power generation can be promoted, and overall power generation revenue can be improved.

An existing energy storage architecture includes a cell, an energy storage converter (power conversion system, PCS), and a transformer. The energy storage converter uses a direct current/alternating current (DC/AC) power conversion topology. In this energy storage architecture, a direct current input voltage range of the energy storage converter is usually narrow, and a cell operating voltage range is wide. Consequently, a cell capacity is not fully used, and the cell capacity is wasted.

SUMMARY

This application provides an energy storage system and a photovoltaic energy storage system. In the energy storage system and the photovoltaic energy storage system, a DC/DC conversion topology may enable voltages a cell string and a DC/AC conversion topology to be adaptable, so that a cell capacity can be fully used, and a waste of the cell capacity can be reduced.

In view of this, a first aspect of the embodiments of this application provides an energy storage system. The energy storage system includes M cell strings and N energy storage converters, a first end of any one of the N energy storage converters is coupled to at least one of the M cell strings, a second end of the any energy storage converter is configured to connect to a power grid, M and N are integers greater than 0, and M≥N; a first end of a first energy storage converter is coupled to Q cell strings in the M cell strings, the first energy storage converter includes a direct current/alternating current DC/AC conversion unit and at least one direct current/direct current (direct current/direct current, DC/DC) conversion unit, Q is an integer greater than 0, Q≤M, and the first energy storage converter is any one of the N energy storage converters; a first DC/DC conversion unit is coupled to at least one of the Q cell strings by using the first end of the first energy storage converter, the first DC/DC conversion unit is coupled to the DC/AC conversion unit, the DC/AC conversion unit is coupled to the power grid by using a second end of the first energy storage converter, and the first DC/DC conversion unit is any one of the at least one DC/DC conversion unit; and the first DC/DC conversion unit is configured to perform adaptation between a voltage of the DC/AC conversion unit and a voltage of at least one of the Q cell strings. The first DC/DC conversion unit may perform adaptation between the voltage of the DC/AC conversion unit and a voltage of at least one of the Q cell strings, so that a cell capacity can be fully used, and a waste of the cell capacity can be reduced.

Optionally, with reference to the first aspect, in a first possible implementation of the first aspect, the energy storage system further includes a first transformer, and a second end of any one of the N energy storage converters is coupled to the power grid by using the first transformer. The first transformer may perform adaptation between a voltage of the energy storage converter and a voltage of the power grid, so that electric energy of the energy storage system can be transported to the power grid, or the energy storage system can store electric energy of the power grid.

Optionally, with reference to the first aspect or the first possible implementation of the first aspect, in a second possible implementation of the first aspect, the energy storage system further includes X photovoltaic strings and Y photovoltaic inverters, an input end of any one of the Y photovoltaic inverters is coupled to an output end of at least one of the X photovoltaic strings, output ends of the Y photovoltaic inverters are coupled to second ends of the N energy storage converters, and X and Y are integers greater than 0. The energy storage system may include X photovoltaic strings and Y photovoltaic inverters. The photovoltaic string may convert light energy into a direct current, and the photovoltaic inverter converts the direct current into an alternating current, so that the alternating current can be transported to the power grid, or can be converted into a direct current by using the energy storage converter for storage in the cell string. In this way, the energy storage system can transport electric energy to the power grid, and can also store electric energy in the cell string.

Optionally, with reference to the second possible implementation of the first aspect, in a third possible implementation of the first aspect, the energy storage system further includes a second transformer, and an output end of any one of the Y photovoltaic inverters is coupled to the power grid by using the second transformer. The second transformer may perform adaptation between an output end voltage of the photovoltaic inverter and a voltage of the power grid, so that electric energy generated by the photovoltaic string can be transported to the power grid.

Optionally, with reference to the first aspect, in a fourth possible implementation of the first aspect, both ends of any one of the at least one DC/DC conversion unit are connected in parallel to a switch. If a voltage of the cell string and a voltage of the energy storage converter are adaptable, the switch connected in parallel to both ends of the DC/DC conversion unit may be closed, so that the DC/DC conversion unit can be short-circuited. In this way, unnecessary energy consumption can be reduced. If a voltage of the cell string and a voltage of the energy storage converter are not adaptable, the switch connected in parallel to both ends of the DC/DC conversion unit is open, and the DC/DC conversion unit performs adaptation between the voltage of the cell string and the voltage of the energy storage converter.

Optionally, with reference to the fourth possible implementation of the first aspect, in a fifth possible implementation of the first aspect, the first energy storage converter is configured to detect voltages of the Q cell strings, and when a voltage of any one of the Q cell strings is greater than or equal to a first voltage threshold, a switch connected in parallel to a DC/DC conversion unit coupled to the cell string whose voltage is greater than or equal to the first voltage threshold is closed; and when a voltage of any one of the Q cell strings is less than or equal to a second voltage threshold, a switch connected in parallel to a DC/DC conversion unit connected to the cell string whose voltage is less than or equal to the second voltage threshold is open, where the first voltage threshold is greater than or equal to the second voltage threshold. The first voltage threshold and the second voltage threshold are related to a voltage value of the power grid and a current value of an output end.

Optionally, with reference to the second possible implementation of the first aspect, in a sixth possible implementation of the first aspect, the energy storage system further includes a controller, the controller is coupled to each of the Y photovoltaic inverters, the controller is coupled to each of the N energy storage converters, and the controller is configured to communicate with the Y photovoltaic inverters and the N energy storage converters. The controller may communicate with the Y photovoltaic inverters and the N energy storage converters, so that the controller can detect power generation statuses of the X photovoltaic strings by using the Y photovoltaic inverters, and can detect quantities of electricity of the M cell strings by using the N energy storage converters.

Optionally, with reference to the sixth possible implementation of the first aspect, in a seventh possible implementation of the first aspect, the controller is further configured to obtain grid feed-in power, and when the controller detects that total power of the Y photovoltaic inverters is greater than or equal to the grid feed-in power, the controller controls the N energy storage converters to charge the M cell strings; and when the controller detects that the total power of the Y photovoltaic inverters is less than the grid feed-in power, the controller controls, by using the N energy storage converters, the M cell strings to discharge. When the controller detects that the total power of the Y photovoltaic inverters is greater than or equal to the grid feed-in power, it indicates that the total output power of the Y photovoltaic inverters is excessively high, energy generated by the Y photovoltaic inverters may be stored, and the controller may control the N energy storage converters to charge the M cell strings. When the controller detects that the total output power of the Y photovoltaic inverters is less than the grid feed-in power, the controller may control, by using the N energy storage converters, the M cell strings to discharge, to compensate for a shortage of the output power of the photovoltaic inverters.

Optionally, with reference to the sixth possible implementation of the first aspect, in an eighth possible implementation of the first aspect, when an output voltage frequency of any one of the N energy storage converters or the Y photovoltaic inverters is greater than a first preset voltage frequency threshold, each of the Y photovoltaic inverters performs output with reduced power based on a preset power curve of the photovoltaic inverter, and the N energy storage converters charge the M cell strings; and when an output end voltage frequency of any one of the N energy storage converters or the Y photovoltaic inverters is less than a second preset voltage frequency threshold, each of the Y photovoltaic inverters performs output with increased power based on a preset power curve of the photovoltaic inverter, and the N energy storage converters control the M cell strings to discharge, where the first preset voltage frequency threshold is greater than a preset power grid voltage normal frequency value, and the second preset voltage frequency threshold is less than the preset power grid voltage normal frequency value. In this way, power of the photovoltaic inverter can fall within a normal range.

Optionally, with reference to the sixth to the eighth possible implementations of the first aspect, in a ninth possible implementation of the first aspect, the controller is further configured to obtain a quantity of electricity of each of the M cell strings by using the N energy storage converters; when the N energy storage converters charge the M cell strings, the controller controls the N energy storage converters to preferentially charge a cell string with a small quantity of electricity in the M cell strings; and when the M cell strings discharge, the controller preferentially controls, by using the N energy storage converters, a cell string with a large quantity of electricity in the M cell strings to discharge. In this way, the cell string with a small quantity of electricity can be preferentially charged, and the cell string with a large quantity of electricity can preferentially discharge, so that quantities of electricity of all of the cell strings can be kept balanced to the greatest extent.

Optionally, with reference to the first aspect, in a tenth possible implementation of the first aspect, the energy storage system further includes a meter, the meter is configured to connect to second ends of the N energy storage converters, and the meter is configured to measure amount of charging electricity and amount of discharging electricity of the N energy storage converters.

Optionally, with reference to the first aspect, in an eleventh possible implementation of the first aspect, any one of the at least one DC/DC conversion unit is coupled to one of the Q cell strings. If a DC/DC conversion unit is connected to a plurality of cell strings connected in parallel, a consistency requirement for the cell strings connected in parallel is relatively high. When the DC/DC conversion unit is connected to only one cell string, consistency of the cell string is relatively low.

A second aspect of this application provides an energy storage system. The energy storage system includes M cell strings, N direct current/alternating current DC/DC power conversion devices, and at least one DC/AC power conversion device, a first end of any one of the N DC/DC power conversion devices is coupled to at least one of the M cell strings, a second end of the any DC/DC power conversion device is coupled to a first end of one of the at least one DC/AC power conversion device, a second end of the DC/AC power conversion device is configured to connect to a power grid, M and N are integers greater than 0, and M≥N; a first end of a first DC/DC power conversion device is coupled to Q cell strings in the M cell strings, the first DC/DC power conversion device includes at least one DC/DC conversion unit, the first DC/DC power conversion device is any one of the N DC/DC power conversion devices, Q is an integer greater than 0, and Q≤M; a first DC/DC conversion unit is coupled to at least one of the Q cell strings by using the first end of the first DC/DC power conversion device, the first DC/DC conversion unit is coupled to a first end of one of the at least one DC/AC power conversion device by using a second end of the first DC/DC power conversion device, and the first DC/DC conversion unit is any one of the at least one DC/DC conversion unit; and the first DC/DC conversion unit is configured to perform adaptation between a voltage of one of the at least one DC/AC power conversion device and a voltage of at least one of the Q cell strings. The DC/DC conversion unit may perform adaptation between a voltage of a DC/AC power conversion device and a voltage of a cell string, so that a cell capacity can be fully used, and a waste of the cell capacity can be reduced.

Optionally, with reference to the second aspect, in a first possible implementation of the second aspect, the energy storage system further includes a first transformer, and a second end of the at least one DC/AC power conversion device is coupled to the power grid by using the first transformer. The first transformer may perform adaptation between an output voltage of the DC/AC power conversion device and a voltage of the power grid, so that electric energy of the photovoltaic energy storage system can be transported to the power grid, or the photovoltaic energy storage system can store electric energy of the power grid.

Optionally, with reference to the second aspect or the first possible implementation of the second aspect, in a second possible implementation of the second aspect, the energy storage system further includes X photovoltaic strings and Y photovoltaic inverters, an input end of any one of the Y photovoltaic inverters is coupled to an output end of at least one of the X photovoltaic strings, output ends of the Y photovoltaic inverters are coupled to the second end of the at least one DC/AC power conversion device, and X and Y are integers greater than 0. The energy storage system may include X photovoltaic strings and Y photovoltaic inverters. The photovoltaic string may convert light energy into a direct current, and the photovoltaic inverter converts the direct current into an alternating current, so that the alternating current can be transported to the power grid, or can be converted into a direct current by using the energy storage converter for storage in the cell string. In this way, the energy storage system can transport electric energy to the power grid, and can also store electric energy in the cell string.

Optionally, with reference to the second possible implementation of the second aspect, in a third possible implementation of the second aspect, the energy storage system further includes a second transformer, and an output end of any one of the Y photovoltaic inverters is connected to the power grid by using the second transformer. The second transformer may perform adaptation between an output end voltage of the photovoltaic inverter and a voltage of the power grid, so that electric energy generated by the photovoltaic string can be transported to the power grid.

Optionally, with reference to the second aspect, in a fourth possible implementation of the second aspect, both ends of any one of the at least one DC/DC conversion unit are connected in parallel to a switch. If a voltage of the cell string and a voltage of the DC/AC power conversion device are adaptable, the switch connected in parallel to both ends of the DC/DC conversion unit may be closed, so that the DC/DC conversion unit can be short-circuited. In this way, unnecessary energy consumption can be reduced. If a voltage of the cell string and a voltage of the DC/AC power conversion device are not adaptable, the switch connected in parallel to both ends of the DC/DC conversion unit is open, and the DC/DC conversion unit performs adaptation between the voltage of the cell string and a voltage of an energy storage converter.

Optionally, with reference to the fourth possible implementation of the second aspect, in a fifth possible implementation of the second aspect, the first DC/DC power conversion device is configured to detect voltages of the Q cell strings, and when a voltage of any one of the Q cell strings is greater than or equal to a first voltage threshold, a switch connected in parallel to a DC/DC conversion unit coupled to the cell string whose voltage is greater than or equal to the first voltage threshold is closed; and when a voltage of any one of the Q cell strings is less than or equal to a second voltage threshold, a switch connected in parallel to a DC/DC conversion unit connected to the cell string whose voltage is less than or equal to the second voltage threshold is open, where the first voltage threshold is greater than or equal to the second voltage threshold. The first voltage threshold and the second voltage threshold are related to a voltage value of the power grid and a current value of an output end.

Optionally, with reference to the second possible implementation of the second aspect, in a sixth possible implementation of the second aspect, the energy storage system further includes a controller, the controller is coupled to each of the Y photovoltaic inverters, the controller is coupled to each of the N DC/DC power conversion devices, and the controller is configured to communicate with the Y photovoltaic inverters and the N DC/DC power conversion devices. The controller may communicate with the Y photovoltaic inverters and the N DC/DC power conversion devices, so that the controller can detect power generation statuses of the X photovoltaic strings by using the Y photovoltaic inverters, and can detect quantities of electricity of the M cell strings by using the N DC/DC power conversion devices.

Optionally, with reference to the sixth possible implementation of the second aspect, in a seventh possible implementation of the second aspect, the controller is further configured to obtain grid feed-in power, and when the controller detects that total power of the Y photovoltaic inverters is greater than or equal to the grid feed-in power, the controller controls the N DC/DC power conversion devices to charge the M cell strings; and when the controller detects that the total power of the Y photovoltaic inverters is less than the grid feed-in power, the controller controls, by using the N DC/DC power conversion devices, the M cell strings to discharge. When the controller detects that the total power of the Y photovoltaic inverters is greater than or equal to the grid feed-in power, it indicates that the total output power of the Y photovoltaic inverters is excessively high, energy generated by the Y photovoltaic inverters may be stored, and the controller may control the N energy storage converters to charge the M cell strings. When the controller detects that the total output power of the Y photovoltaic inverters is less than the grid feed-in power, the controller may control, by using the N energy storage converters, the M cell strings to discharge, to compensate for a shortage of the output power of the photovoltaic inverters.

Optionally, with reference to the sixth possible implementation of the second aspect, in an eighth possible implementation of the second aspect, when an output voltage frequency of any one of the N DC/DC power conversion devices or the Y photovoltaic inverters is greater than a first preset voltage frequency threshold, each of the Y photovoltaic inverters performs output with reduced power based on a preset power curve of the photovoltaic inverter, and the N DC/DC power conversion devices charge the M cell strings; and when an output end voltage frequency of any one of the N DC/DC power conversion devices or the Y photovoltaic inverters is less than a second preset voltage frequency threshold, each of the Y photovoltaic inverters performs output with increased power based on a preset power curve of the photovoltaic inverter, and the N DC/DC power conversion devices control the M cell strings to discharge, where the first preset voltage frequency threshold is greater than a preset power grid voltage normal frequency value, and the second preset voltage frequency threshold is less than the preset power grid voltage normal frequency value. In this way, power of the photovoltaic inverter can fall within a normal range.

Optionally, with reference to any one of the sixth to the eighth possible implementations of the second aspect, in a ninth possible implementation of the second aspect, the controller is further configured to obtain a quantity of electricity of each of the M cell strings by using the N DC/DC power conversion devices; when the N DC/DC power conversion devices charge the M cell strings, the controller controls the N DC/DC power conversion devices to preferentially charge a cell string with a small quantity of electricity in the M cell strings; and when the M cell strings discharge, the controller preferentially controls, by using the N DC/DC power conversion devices, a cell string with a large quantity of electricity in the M cell strings to discharge. In this way, the cell string with a small quantity of electricity can be preferentially charged, and the cell string with a large quantity of electricity can preferentially discharge, so that quantities of electricity of all of the cell strings can be kept balanced to the greatest extent.

Optionally, with reference to the second aspect, in a tenth possible implementation of the second aspect, the energy storage system further includes a meter, the meter is configured to connect to second ends of the N DC/DC power conversion devices, and the meter is configured to measure amount of charging electricity and amount of discharging electricity of the N DC/DC power conversion devices.

Optionally, with reference to the second aspect, in an eleventh possible implementation of the second aspect, any one of the at least one DC/DC conversion unit is coupled to one of the Q cell strings. If a DC/DC conversion unit is connected to a plurality of cell strings connected in parallel, a consistency requirement for the cell strings connected in parallel is relatively high. When the DC/DC conversion unit is connected to only one cell string, consistency of the cell string is relatively low.

Optionally, with reference to the second aspect, in a twelfth possible implementation of the second aspect, the N DC/DC power conversion devices are connected to the at least one DC/AC power conversion device through a bus.

A third aspect of this application provides a photovoltaic energy storage system. The photovoltaic energy storage system includes M cell strings, N energy storage converters, X photovoltaic strings, and Y photovoltaic inverters, a first end of any one of the N energy storage converters is coupled to at least one of the M cell strings, a second end of the any energy storage converter is configured to connect to a power grid, an input end of any one of the Y photovoltaic inverters is coupled to an output end of at least one of the X photovoltaic strings, output ends of the Y photovoltaic inverters are coupled to second ends of the N energy storage converters, M and N are integers greater than 0, M≥N, and X and Y are integers greater than 0; a first end of a first energy storage converter is coupled to Q cell strings in the M cell strings, the first energy storage converter includes a direct current/alternating current DC/AC conversion unit and at least one direct current/direct current DC/DC conversion unit, Q is an integer greater than 0, Q≤M, and the first energy storage converter is any one of the N energy storage converters; a first DC/DC conversion unit is coupled to at least one of the Q cell strings by using the first end of the first energy storage converter, the first DC/DC conversion unit is coupled to the DC/AC conversion unit, the DC/AC conversion unit is coupled to the power grid by using a second end of the first energy storage converter, and the first DC/DC conversion unit is any one of the at least one DC/DC conversion unit; and the first DC/DC conversion unit is configured to perform adaptation between a voltage of the DC/AC conversion unit and a voltage of at least one of the Q cell strings. In the photovoltaic energy storage system, the first DC/DC conversion unit may perform adaptation between the voltage of the DC/AC conversion unit and a voltage of at least one of the Q cell strings, so that a cell capacity can be fully used, and a waste of the cell capacity can be reduced. In addition, in the photovoltaic energy storage system, a charging path and a discharging path do not include a transformer, so that the charging path and the discharging path of the photovoltaic energy storage system can be shortened, thereby improving charging and discharging efficiency of a cell.

Optionally, with reference to the third aspect, in a first possible implementation of the third aspect, the photovoltaic energy storage system further includes a first transformer, and a second end of any one of the N energy storage converters is coupled to the power grid by using the first transformer. The first transformer may perform adaptation between a voltage of the energy storage converter and a voltage of the power grid, so that electric energy of the energy storage system can be transported to the power grid, or the energy storage system can store electric energy of the power grid.

Optionally, with reference to the third aspect, in a second possible implementation of the third aspect, both ends of any one of the at least one DC/DC conversion unit are connected in parallel to a switch. If a voltage of the cell string and a voltage of the energy storage converter are adaptable, the switch connected in parallel to both ends of the DC/DC conversion unit may be closed, so that the DC/DC conversion unit can be short-circuited. In this way, unnecessary energy consumption can be reduced. If a voltage of the cell string and a voltage of the energy storage converter are not adaptable, the switch connected in parallel to both ends of the DC/DC conversion unit is open, and the DC/DC conversion unit performs adaptation between the voltage of the cell string and the voltage of the energy storage converter.

Optionally, with reference to the second possible implementation of the third aspect, in a third possible implementation of the third aspect, the first energy storage converter is configured to detect voltages of the Q cell strings, and when a voltage of any one of the Q cell strings is greater than or equal to a first voltage threshold, a switch connected in parallel to a DC/DC conversion unit coupled to the cell string whose voltage is greater than or equal to the first voltage threshold is closed; and when a voltage of any one of the Q cell strings is less than or equal to a second voltage threshold, a switch connected in parallel to a DC/DC conversion unit connected to the cell string whose voltage is less than or equal to the second voltage threshold is open, where the first voltage threshold is greater than or equal to the second voltage threshold. The first voltage threshold and the second voltage threshold are related to a voltage value of the power grid and a current value of an output end.

Optionally, with reference to the third aspect, in a fourth possible implementation of the third aspect, the photovoltaic energy storage system further includes a controller, the controller is coupled to each of the Y photovoltaic inverters, the controller is coupled to each of the N energy storage converters, and the controller is configured to communicate with the Y photovoltaic inverters and the N energy storage converters. The controller may communicate with the Y photovoltaic inverters and the N energy storage converters, so that the controller can detect power generation statuses of the X photovoltaic strings by using the Y photovoltaic inverters, and can detect quantities of electricity of the M cell strings by using the N energy storage converters.

Optionally, with reference to the fourth possible implementation of the third aspect, in a fifth possible implementation of the third aspect, the controller is further configured to obtain grid feed-in power, and when the controller detects that total power of the Y photovoltaic inverters is greater than or equal to the grid feed-in power, the controller controls the N energy storage converters to charge the M cell strings; and when the controller detects that the total power of the Y photovoltaic inverters is less than the grid feed-in power, the controller controls, by using the N energy storage converters, the M cell strings to discharge. When the controller detects that the total power of the Y photovoltaic inverters is greater than or equal to the grid feed-in power, it indicates that the total output power of the Y photovoltaic inverters is excessively high, energy generated by the Y photovoltaic inverters may be stored, and the controller may control the N energy storage converters to charge the M cell strings. When the controller detects that the total output power of the Y photovoltaic inverters is less than the grid feed-in power, the controller may control, by using the N energy storage converters, the M cell strings to discharge, to compensate for a shortage of the output power of the photovoltaic inverters.

Optionally, with reference to the fourth possible implementation of the third aspect, in a sixth possible implementation of the third aspect, when an output voltage frequency of any one of the N energy storage converters or the Y photovoltaic inverters is greater than a first preset voltage frequency threshold, each of the Y photovoltaic inverters performs output with reduced power based on a preset power curve of the photovoltaic inverter, and the N energy storage converters charge the M cell strings; and when an output end voltage frequency of any one of the N energy storage converters or the Y photovoltaic inverters is less than a second preset voltage frequency threshold, each of the Y photovoltaic inverters performs output with increased power based on a preset power curve of the photovoltaic inverter, and the N energy storage converters control the M cell strings to discharge, where the first preset voltage frequency threshold is greater than a preset power grid voltage normal frequency value, and the second preset voltage frequency threshold is less than the preset power grid voltage normal frequency value. In this way, power of the photovoltaic inverter can fall within a normal range.

Optionally, with reference to any one of the fourth to the sixth possible implementations of the third aspect, in a seventh possible implementation of the third aspect, the controller is further configured to obtain a quantity of electricity of each of the M cell strings by using the N energy storage converters; when the N energy storage converters charge the M cell strings, the controller controls the N energy storage converters to preferentially charge a cell string with a small quantity of electricity in the M cell strings; and when the M cell strings discharge, the controller preferentially controls, by using the N energy storage converters, a cell string with a large quantity of electricity in the M cell strings to discharge. In this way, the cell string with a small quantity of electricity can be preferentially charged, and the cell string with a large quantity of electricity can preferentially discharge, so that quantities of electricity of all of the cell strings can be kept balanced to the greatest extent.

Optionally, with reference to the third aspect, in an eighth possible implementation of the third aspect, the energy storage system further includes a meter, the meter is configured to connect to second ends of the N energy storage converters, and the meter is configured to measure amount of charging electricity and amount of discharging electricity of the N energy storage converters.

Optionally, with reference to the third aspect, in a ninth possible implementation of the third aspect, any one of the at least one DC/DC conversion unit is coupled to one of the Q cell strings. If a DC/DC conversion unit is connected to a plurality of cell strings connected in parallel, a consistency requirement for the cell strings connected in parallel is relatively high. When the DC/DC conversion unit is connected to only one cell string, consistency of the cell string is relatively low.

A fourth aspect of this application provides a photovoltaic energy storage system. The photovoltaic energy storage system includes M cell strings, N direct current/alternating current DC/DC power conversion devices, at least one DC/AC power conversion device, X photovoltaic strings, and Y photovoltaic inverters, a first end of any one of the N DC/DC power conversion devices is coupled to at least one of the M cell strings, a second end of the any DC/DC power conversion device is coupled to a first end of one of the at least one DC/AC power conversion device, a second end of the DC/AC power conversion device is configured to connect to a power grid, an input end of any one of the Y photovoltaic inverters is coupled to an output end of at least one of the X photovoltaic strings, output ends of the Y photovoltaic inverters are coupled to a second end of the at least one DC/AC power conversion device, X and Y are integers greater than 0, M and N are integers greater than 0, and M≥N; a first end of a first DC/DC power conversion device is coupled to Q cell strings in the M cell strings, the first DC/DC power conversion device includes at least one DC/DC conversion unit, the first DC/DC power conversion device is any one of the N DC/DC power conversion devices, Q is an integer greater than 0, and Q≤M; a first DC/DC conversion unit is coupled to at least one of the Q cell strings by using the first end of the first DC/DC power conversion device, the first DC/DC conversion unit is coupled to a first end of one of the at least one DC/AC power conversion device by using a second end of the first DC/DC power conversion device, and the first DC/DC conversion unit is any one of the at least one DC/DC conversion unit; and the first DC/DC conversion unit is configured to perform adaptation between a voltage of one of the at least one DC/AC power conversion device and a voltage of at least one of the Q cell strings. The DC/DC conversion unit may perform adaptation between a voltage of a DC/AC power conversion device and a voltage of a cell string, so that a cell capacity can be fully used, and a waste of the cell capacity can be reduced. In addition, in the photovoltaic energy storage system, a charging path and a discharging path do not include a transformer, so that the charging path and the discharging path of the photovoltaic energy storage system can be shortened, thereby improving charging and discharging efficiency of a cell.

Optionally, with reference to the fourth aspect, in a first possible implementation of the fourth aspect, the photovoltaic energy storage system further includes a first transformer, and a second end of the at least one DC/AC power conversion device is coupled to the power grid by using the first transformer. The first transformer may perform adaptation between an output voltage of the DC/AC power conversion device and a voltage of the power grid, so that electric energy of the photovoltaic energy storage system can be transported to the power grid, or the photovoltaic energy storage system can store electric energy of the power grid.

Optionally, with reference to the fourth aspect, in a second possible implementation of the fourth aspect, both ends of any one of the at least one DC/DC conversion unit are connected in parallel to a switch. If a voltage of the cell string and a voltage of the DC/AC power conversion device are adaptable, the switch connected in parallel to both ends of the DC/DC conversion unit may be closed, so that the DC/DC conversion unit can be short-circuited. In this way, unnecessary energy consumption can be reduced. If a voltage of the cell string and a voltage of the DC/AC power conversion device are not adaptable, the switch connected in parallel to both ends of the DC/DC conversion unit is open, and the DC/DC conversion unit performs adaptation between the voltage of the cell string and a voltage of an energy storage converter.

Optionally, with reference to the second possible implementation of the fourth aspect, in a third possible implementation of the second aspect, the first DC/DC power conversion device is configured to detect voltages of the Q cell strings, and when a voltage of any one of the Q cell strings is greater than or equal to a first voltage threshold, a switch connected in parallel to a DC/DC conversion unit coupled to the cell string whose voltage is greater than or equal to the first voltage threshold is closed; and when a voltage of any one of the Q cell strings is less than or equal to a second voltage threshold, a switch connected in parallel to a DC/DC conversion unit connected to the cell string whose voltage is less than or equal to the second voltage threshold is open, where the first voltage threshold is greater than or equal to the second voltage threshold. The first voltage threshold and the second voltage threshold are related to a voltage value of the power grid and a current value of an output end.

Optionally, with reference to the fourth aspect, in a fourth possible implementation of the fourth aspect, the energy storage system further includes a controller, the controller is coupled to each of the Y photovoltaic inverters, the controller is coupled to each of the N DC/DC power conversion devices, and the controller is configured to communicate with the Y photovoltaic inverters and the N DC/DC power conversion devices. The controller may communicate with the Y photovoltaic inverters and the N DC/DC power conversion devices, so that the controller can detect power generation statuses of the X photovoltaic strings by using the Y photovoltaic inverters, and can detect quantities of electricity of the M cell strings by using the N DC/DC power conversion devices.

Optionally, with reference to the fourth possible implementation of the fourth aspect, in a fifth possible implementation of the fourth aspect, the controller is further configured to obtain grid feed-in power, and when the controller detects that total power of the Y photovoltaic inverters is greater than or equal to the grid feed-in power, the controller controls the N DC/DC power conversion devices to charge the M cell strings; and when the controller detects that the total power of the Y photovoltaic inverters is less than the grid feed-in power, the controller controls, by using the N DC/DC power conversion devices, the M cell strings to discharge. When the controller detects that the total output power of the Y photovoltaic inverters is less than the grid feed-in power, the controller may control, by using the N DC/DC power conversion devices, the M cell strings to discharge, to compensate for a shortage of the output power of the photovoltaic inverters.

Optionally, with reference to the fourth possible implementation of the fourth aspect, in a sixth possible implementation of the fourth aspect, when an output voltage frequency of any one of the N DC/DC power conversion devices or the Y photovoltaic inverters is greater than a first preset voltage frequency threshold, each of the Y photovoltaic inverters performs output with reduced power based on a preset power curve of the photovoltaic inverter, and the N DC/DC power conversion devices charge the M cell strings; and when an output end voltage frequency of any one of the N DC/DC power conversion devices or the Y photovoltaic inverters is less than a second preset voltage frequency threshold, each of the Y photovoltaic inverters performs output with increased power based on a preset power curve of the photovoltaic inverter, and the N DC/DC power conversion devices control the M cell strings to discharge, where the first preset voltage frequency threshold is greater than a preset power grid voltage normal frequency value, and the second preset voltage frequency threshold is less than the preset power grid voltage normal frequency value. In this way, power of the photovoltaic inverter can fall within a normal range.

Optionally, with reference to any one of the fourth to the sixth possible implementations of the fourth aspect, in a seventh possible implementation of the fourth aspect, the controller is further configured to obtain a quantity of electricity of each of the M cell strings by using the N DC/DC power conversion devices; when the N DC/DC power conversion devices charge the M cell strings, the controller controls the N DC/DC power conversion devices to preferentially charge a cell string with a small quantity of electricity in the M cell strings; and when the M cell strings discharge, the controller preferentially controls, by using the N DC/DC power conversion devices, a cell string with a large quantity of electricity in the M cell strings to discharge. In this way, the cell string with a small quantity of electricity can be preferentially charged, and the cell string with a large quantity of electricity can preferentially discharge, so that quantities of electricity of all of the cell strings can be kept balanced to the greatest extent.

Optionally, with reference to the fourth aspect, in an eighth possible implementation of the fourth aspect, the energy storage system further includes a meter, the meter is configured to connect to second ends of the N DC/DC power conversion devices, and the meter is configured to measure amount of charging electricity and amount of discharging electricity of the N DC/DC power conversion devices.

Optionally, with reference to the fourth aspect, in a ninth possible implementation of the fourth aspect, any one of the at least one DC/DC conversion unit is coupled to one of the Q cell strings. If a DC/DC conversion unit is connected to a plurality of cell strings connected in parallel, a consistency requirement for the cell strings connected in parallel is relatively high. When the DC/DC conversion unit is connected to only one cell string, consistency of the cell string is relatively low.

Optionally, with reference to the fourth aspect, in a tenth possible implementation of the fourth aspect, the N DC/DC power conversion devices are connected to the at least one DC/AC power conversion device through a bus.

The embodiments of this application provide an energy storage system. The energy storage system includes M cell strings and N energy storage converters, a first end of any one of the N energy storage converters is coupled to at least one of the M cell strings, a second end of the any energy storage converter is configured to connect to a power grid, M and N are integers greater than 0, and M≥N; a first end of a first energy storage converter is coupled to Q cell strings in the M cell strings, the first energy storage converter includes a direct current/alternating current DC/AC conversion unit and at least one direct current/direct current (DC/DC) conversion unit, Q is an integer greater than 0, Q≤M, and the first energy storage converter is any one of the N energy storage converters; a first DC/DC conversion unit is coupled to at least one of the Q cell strings by using the first end of the first energy storage converter, the first DC/DC conversion unit is coupled to the DC/AC conversion unit, the DC/AC conversion unit is coupled to the power grid by using a second end of the first energy storage converter, and the first DC/DC conversion unit is any one of the at least one DC/DC conversion unit; and the first DC/DC conversion unit is configured to perform adaptation between a voltage of the DC/AC conversion unit and a voltage of at least one of the Q cell strings. The first DC/DC conversion unit may perform adaptation between the voltage of the DC/AC conversion unit and a voltage of at least one of the Q cell strings, so that a cell capacity can be fully used, and a waste of the cell capacity can be reduced.

BRIEF DESCRIPTION OF DRAWINGS

FIG. 7A and FIG. 7B are a schematic diagram of an embodiment of an energy storage system according to this application;

FIG. 8A and FIG. 8B are a schematic diagram of an embodiment of a photovoltaic energy storage system according to this application;

FIG. 9A and FIG. 9B are a schematic diagram of an embodiment of a photovoltaic energy storage system according to this application.

DESCRIPTION OF EMBODIMENTS

The following clearly and completely describes the technical solutions in the embodiments of the present disclosure with reference to the accompanying drawings in the embodiments of the present disclosure. It is clear that the described embodiments are merely some rather than all of the embodiments of the present disclosure. All other embodiments obtained by persons skilled in the art based on the embodiments of the present disclosure without creative efforts shall fall within the protection scope of the present disclosure.

In the specification, claims, and accompanying drawings of this application, the terms "first", "second", and the like are intended to distinguish between similar objects but do not necessarily indicate a specific order. It should be understood that the data termed in such a way is interchangeable in proper circumstances so that the embodiments of the present disclosure described herein can be implemented in other orders than the order illustrated or described herein. Moreover, the terms "include", "contain", and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device.

As a clean renewable energy source, photovoltaic power generation is widely applied. However, the application of photovoltaic power generation also has disadvantages. Main problems of photovoltaic power generation are unpredictability and volatility of output power. As a proportion of photovoltaic power generation in a conventional power grid becomes increasingly larger, a high penetration rate of photovoltaic power generation brings quite large impact on the power grid, and brings a series of problems to voltage stability, electric energy quality, and operation control of the power grid. Currently, an energy storage apparatus may be added to a photovoltaic power generation system, and using a charging/discharging feature of the energy storage apparatus can well resolve the problems of unpredictability and volatility of output power of a photovoltaic power station that are caused by uneven light exposure. In addition, photovoltaic power curtailment phenomena of photovoltaic power generation can be reduced, large-scale consumption of photovoltaic power generation can be promoted, and overall power generation revenue can be improved.

Figure 1:
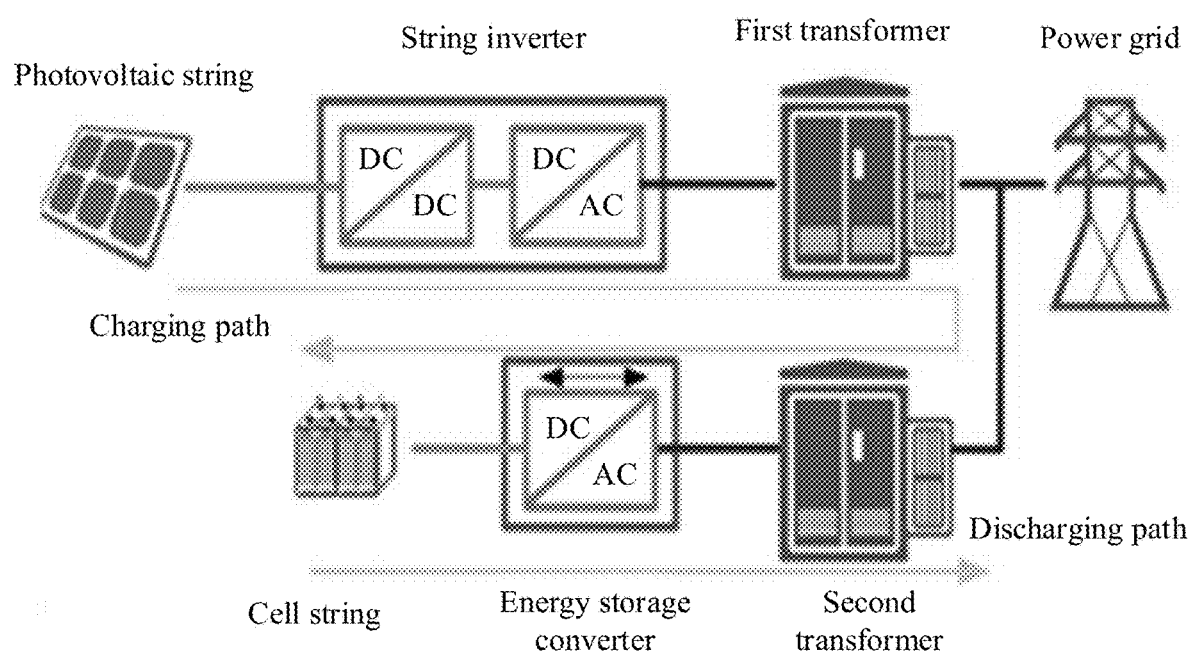
FIG. 1 is a schematic diagram of an embodiment of an energy storage system in a conventional technology according to this application.

Refer to FIG. 1. This application provides an energy storage system in the conventional technology. The energy storage system includes a photovoltaic string, a string inverter, a first transformer, a second transformer, an energy storage converter, and a cell string. The string inverter can convert a direct current generated by the photovoltaic string into an alternating current, and a voltage of the alternating current may be boosted by using the first transformer and then the alternating current is input to a power grid, or the alternating current may pass through the first transformer and the second transformer, and then pass through the energy storage converter to reach the cell string, so that electric energy is stored in the cell string.

In the energy storage system shown in FIG. 1, the energy storage converter uses a DC/AC topology, a direct current input voltage range of the energy storage converter is narrow, and an operating voltage range of the cell string is relatively wide. Consequently, a cell capacity is not fully used, and the cell capacity is wasted.

Figure 2:
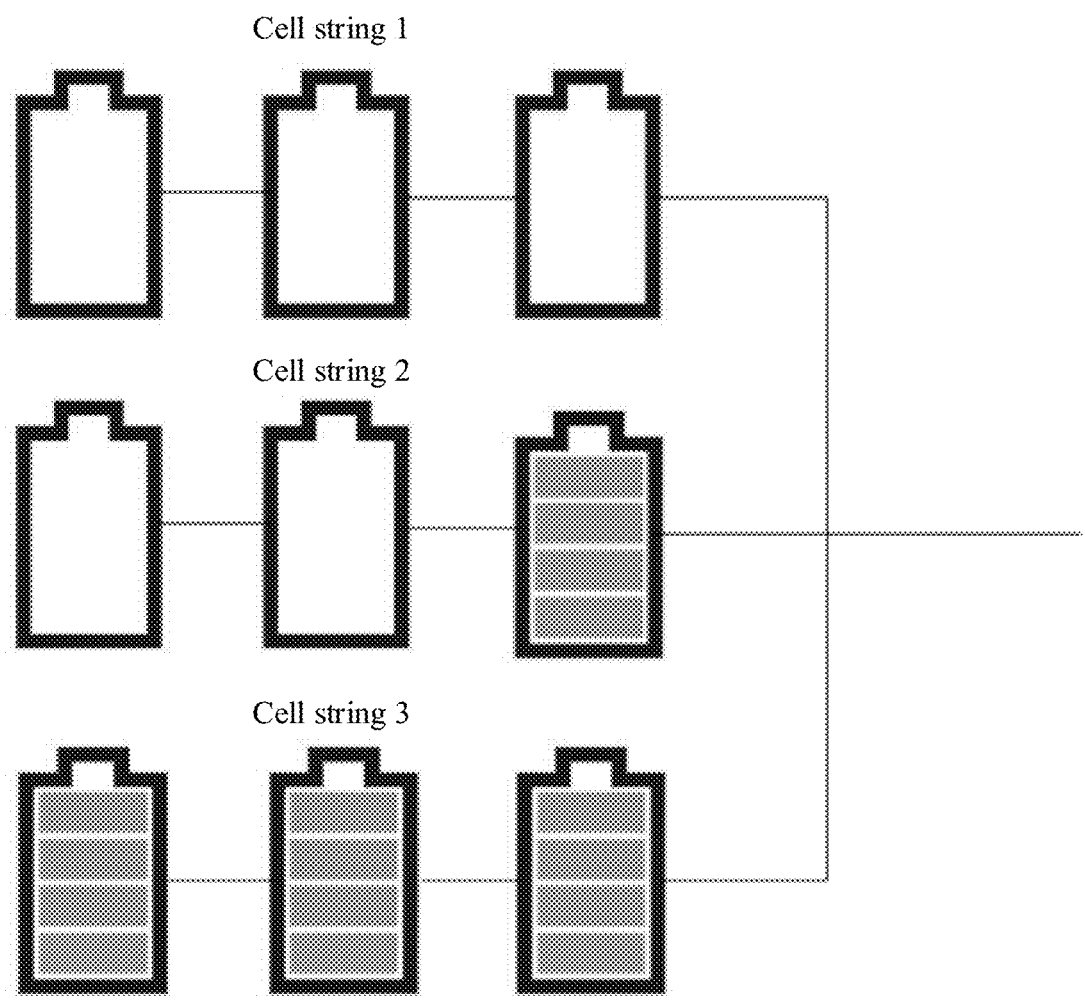
FIG. 2 is a schematic diagram of an embodiment of cell strings connected in parallel in a conventional technology according to this application.

In addition, in the conventional technology, one DC/AC topology in one energy storage converter is connected to a plurality of cell strings. FIG. 2 provides a schematic diagram of cell strings connected in parallel in the conventional technology. If models of cells in the cell strings are inconsistent or resistances of the cell strings are inconsistent, a problem of non-constant currents is caused. For example, if a cell (the rightmost one) in a cell string 2 attenuates, a resistance increases, and the resistance of the cell string 2 is greater than a resistance of a cell string 1. In this case, a discharging current of the cell string with the small resistance is excessively high, and exceeds a cell application specification.

For example, cell strings connected in parallel include only a cell string 1 and a cell string 2. When the cell string 1 and the cell string 2 are normal, each group of cells has a voltage of 1000 volts, a resistance of 0.01 ohms, and a cell current specification of 100 amperes. An energy storage converter outputs 200 kW. In this case, resistances of the cell string 1 and the cell string 2 are equal, and each cell string outputs 100 amperes. If one cell in the cell string 2 attenuates, a resistance of the entire cell string 2 increases to 0.02 ohm, and the energy storage converter outputs 200 kW. In this case, the resistances of the cell string 1 and the cell string 2 are unequal, an output current of the cell string 2 is 66.7 amperes, and an output current of the cell string 1 is 133.3 amperes, and exceeds a cell specification. This is not allowed in application.

If cell models used in cell strings are inconsistent, operating ranges of the cell strings are inconsistent, and therefore cell capacity utilization is low. For example, cell strings connected in parallel include only a cell string 1 and a cell string 3. In the cell string 1, cells of 48 volts are used, and there are a total of 20 such cells (only three cells are drawn in FIG. 2, and the three cells are merely used as a reference). In the cell string 3, cells of 50 volts are used, and there are a total of 20 such cells (only three cells are drawn in FIG. 2, and the three cells are merely used as a reference). A charging cutoff voltage of the cell string 1 is 960 volts, and a charging cutoff voltage of the cell string 3 is 1000 volts. Because the cell string 1 and the cell string 3 are connected in parallel, a charging cutoff voltage is 960 volts. Consequently, the cell string 3 cannot be fully charged, and a cell capacity is wasted. Therefore, this solution does not support a combination of a plurality of types of cells.

Figure 3:
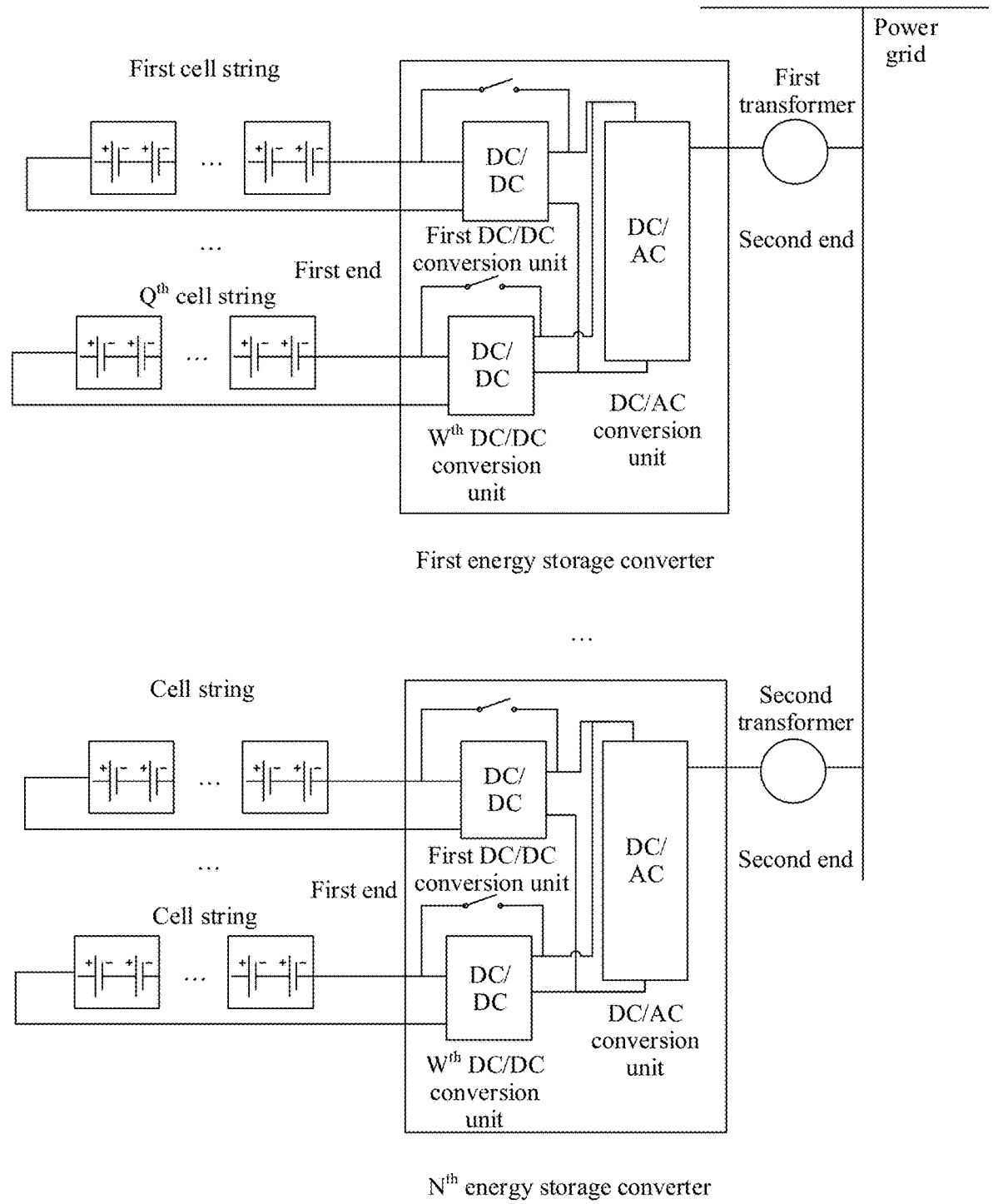
FIG. 3 is a schematic diagram of an embodiment of an energy storage system according to this application.

In view of the foregoing problem, Embodiment 1 of this application provides an energy storage system. Refer to FIG. 3. The energy storage system includes M cell strings and N energy storage converters, a first end of any one of the N energy storage converters is coupled to at least one of the M cell strings, a second end is configured to connect to a power grid, M and N are integers greater than 0, and M≥N. Only two energy storage converters (a first energy storage converter and an $N^{th}$ energy storage converter) are shown in FIG. 3, but this cannot be construed as a limitation. The first energy storage converter is any one of the N energy storage converters.

A first end of the first energy storage converter is connected to Q cell strings in the M cell strings, and the first energy storage converter includes a DC/AC conversion unit and at least one DC/DC conversion unit. (FIG. 3 uses an example in which the first energy storage converter includes two DC/DC conversion units: a first DC/DC conversion unit and a $W^{th}$ DC/DC conversion unit, but is not limited thereto.) Q is an integer greater than 0, and Q≤M.

Any DC/DC conversion unit in the first energy storage converter is coupled to at least one of the Q cell strings by using the first end of the first energy storage converter. (FIG. 3 uses an example in which the first DC/DC conversion unit is connected to a first cell string by using the first end of the first energy storage converter and the $W^{th}$ DC/DC conversion unit is connected to a $Q^{th}$ cell string by using the first end of the first energy storage converter, but is not limited thereto.) Any DC/DC conversion unit in the first energy storage converter is coupled to the DC/AC conversion unit. (FIG. 3 uses an example in which both the first DC/DC conversion unit and the $W^{th}$ DC/DC conversion unit are coupled to the DC/AC conversion unit, but is not limited thereto.) The DC/AC conversion unit is coupled to the power grid by using a second end of the first energy storage converter.

The DC/DC conversion unit in the energy storage system is configured to perform adaptation between a voltage of the DC/AC conversion unit and a voltage of a cell string. (As shown in FIG. 3, the first DC/DC conversion unit in the energy storage system is configured to perform adaptation between the voltage of the DC/AC conversion unit and a voltage of the first cell string, and the $W^{th}$ DC/DC conversion unit is configured to perform adaptation between the voltage of the DC/AC conversion unit and a voltage of the $Q^{th}$ cell string.) Therefore, a cell capacity can be fully used, and a waste of the cell capacity can be reduced.

It should be noted that in the energy storage system, a positive port of each DC/DC conversion unit is coupled to a positive port of a cell string, and a negative port of each DC/DC conversion unit is connected to a negative port of the cell string.

The energy storage system may further include a first transformer, and second ends of the N energy storage converters included in the energy storage system may be coupled to the power grid by using the first transformer. (FIG. 3 uses only an example in which the second end of the first energy storage converter is connected to the power grid by using the first transformer, but is not limited thereto.) The first transformer may perform adaptation between a voltage of the energy storage converter and a voltage of the power grid, so that electric energy of the energy storage system can be transported to the power grid, or the energy storage system can store electric energy of the power grid.

It should be noted that a first end of the energy storage converter in the energy storage system is configured to connect to a cell string, a second end is configured to connect to the power grid, and the first end and the second end may serve as an input end or an output end in different cases. Specifically, during charging, the first end of the energy storage converter is an output end, and the second end is an input end, and during discharging, the first end of the energy storage converter is an input end, and the second end is an output end. The second end may also be connected to any electric appliance, and the energy storage system may be used as a power source to supply power to the electric appliance.

Figure 4A:
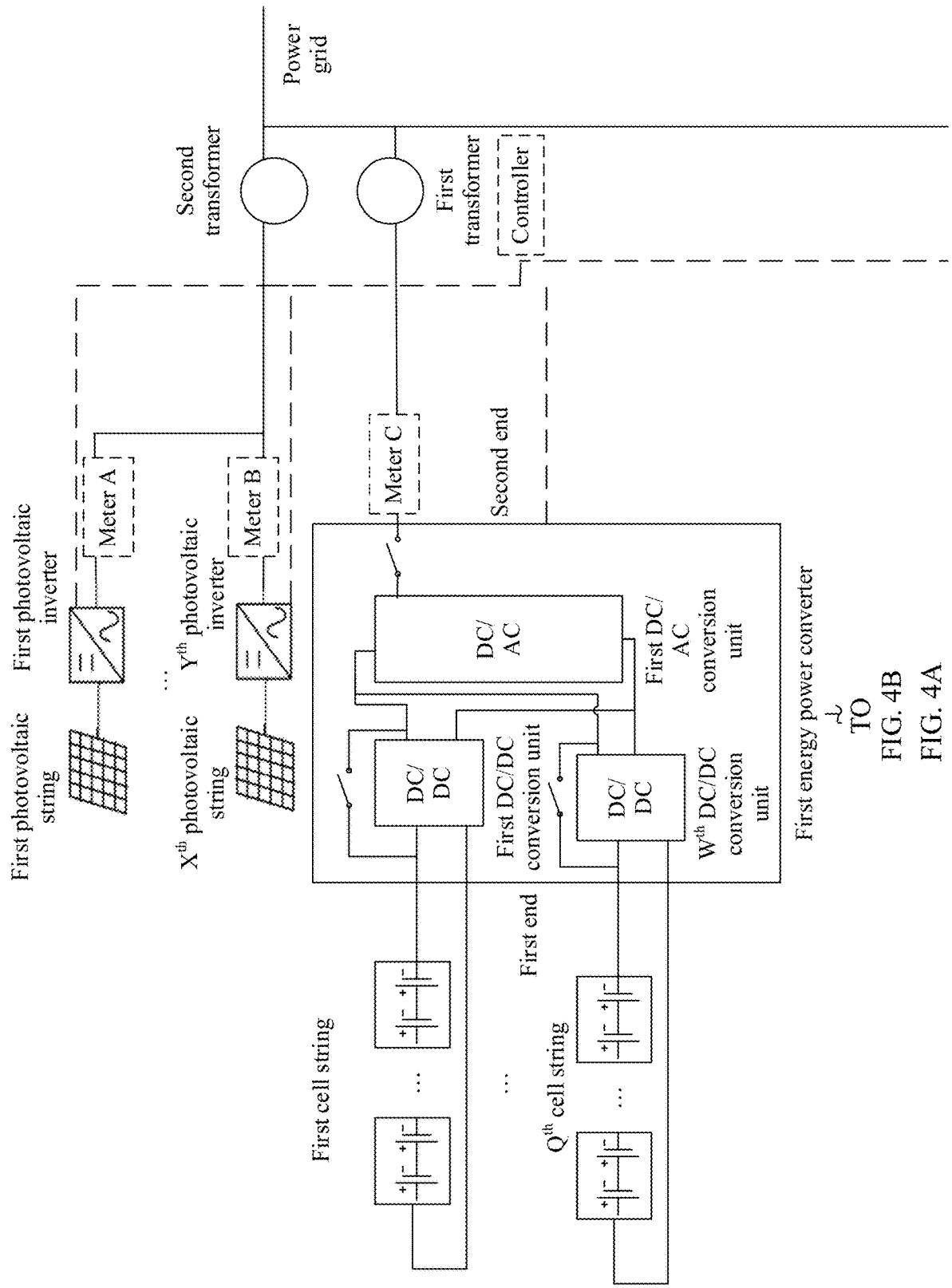
FIG. 4A and FIG. 4B are a schematic diagram of an embodiment of an energy storage system according to this application.
Figure 4B:
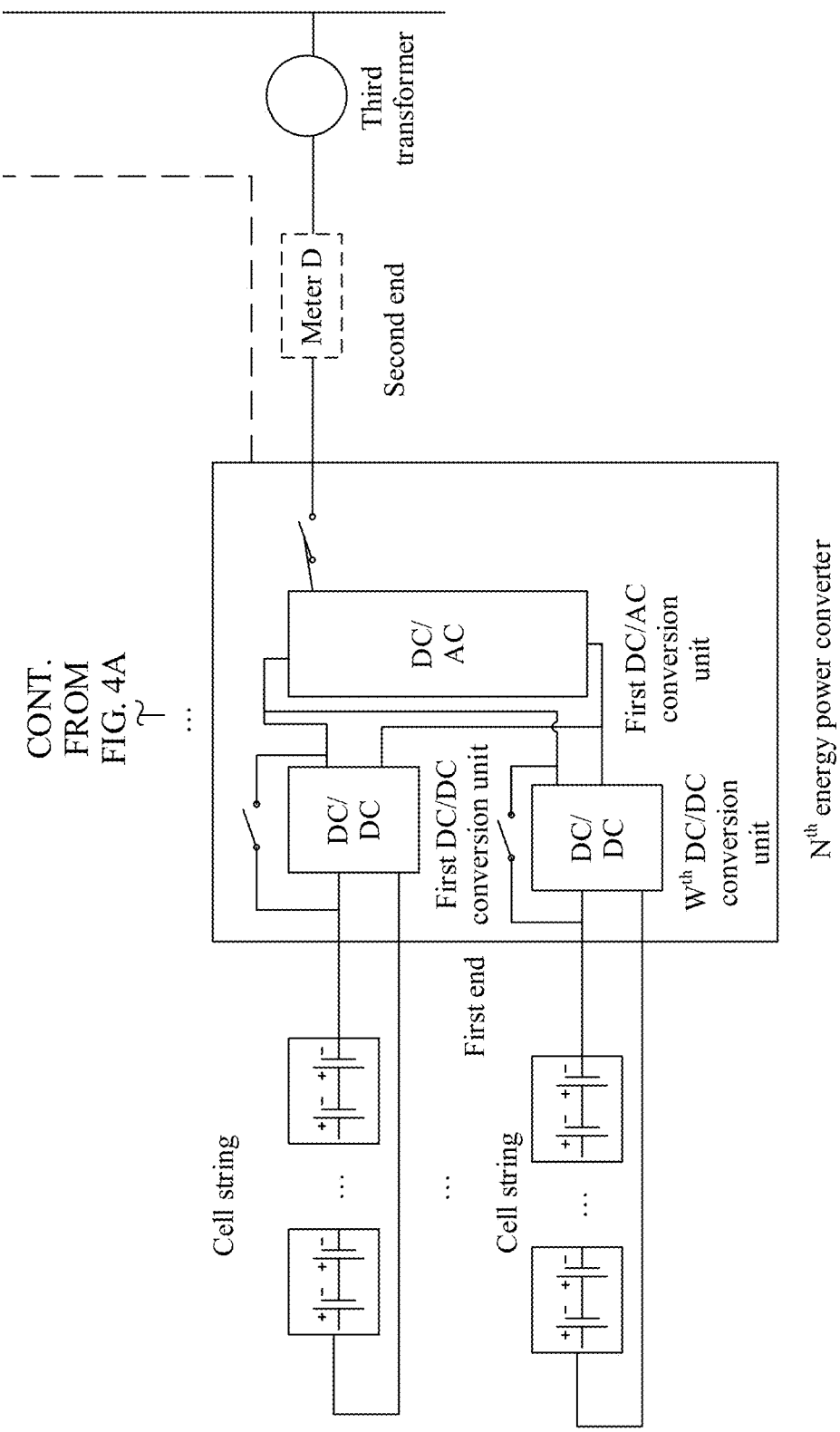

It may be understood that the energy storage system shown in FIG. 3 may further include a photovoltaic string and a photovoltaic inverter, so that the energy storage system can be used as a photovoltaic energy storage system. For details, refer to FIG. 4A and FIG. 4B. FIG. 4A and FIG. 4B are based on FIG. 3. On the basis of FIG. 3, the energy storage system may further include X photovoltaic strings and Y photovoltaic inverters, an input end of any one of the Y photovoltaic inverters is coupled to an output end of at least one of the X photovoltaic strings, output ends of the Y photovoltaic inverters are coupled to second ends of the N energy storage converters, and X and Y are integers greater than 0. (FIG. 4A and FIG. 4B use an example in which one photovoltaic string is connected to one photovoltaic inverter, but is not limited thereto.) The photovoltaic string may convert light energy into a direct current, and the photovoltaic inverter converts the direct current into an alternating current, so that the alternating current can be transported to the power grid, or can be converted into a direct current by using the energy storage converter for storage in the cell string. In this way, the energy storage system can transport electric energy to the power grid, and can also store electric energy in the cell string.

Refer to FIG. 4A and FIG. 4B. The energy storage system may further include a second transformer, and an output end of any one of the Y photovoltaic inverters is coupled to the power grid by using the second transformer. The second transformer may perform adaptation between an output end voltage of the photovoltaic inverter and a voltage of the power grid, so that electric energy generated by the photovoltaic string can be transported to the power grid.

Both ends of a DC/DC conversion unit in any one of the energy storage converters in the energy storage system are connected in parallel to a switch. (For example, both ends of each of the first DC/DC conversion unit and the $W^{th}$ DC/DC conversion unit in FIG. 3 and FIG. 4A and FIG. 4B are connected in parallel to a switch.) If a voltage of the cell string and a voltage of the energy storage converter are adaptable, the switch connected in parallel to both ends of the DC/DC conversion unit may be closed, so that the DC/DC conversion unit can be short-circuited. In this way, unnecessary energy consumption can be reduced. If a voltage of the cell string and a voltage of the energy storage converter are not adaptable, the switch connected in parallel to both ends of the DC/DC conversion unit is open, and the DC/DC conversion unit performs adaptation between the voltage of the cell string and the voltage of the energy storage converter.

It should be noted that in the energy storage system, control modules (not shown in FIG. 3 and FIG. 4A and FIG. 4B) may be disposed in the energy storage converter and the photovoltaic inverter. The control module in the energy storage converter may monitor a voltage of a cell string connected to the energy storage converter, and the control module in the photovoltaic string may monitor a power generation status of the photovoltaic string. For example, in FIG. 3 and FIG. 4A and FIG. 4B, the first energy storage converter may detect, by using a control module, voltages of the Q cell strings connected to the first energy storage converter. When a voltage of any one of the Q cell strings is greater than or equal to a first voltage threshold, a switch connected in parallel to a DC/DC conversion unit coupled to the cell string whose voltage is greater than or equal to the first voltage threshold is closed; and when a voltage of any one of the Q cell strings is less than or equal to a second voltage threshold, a switch connected in parallel to a DC/DC conversion unit connected to the cell string whose voltage is less than or equal to the second voltage threshold is open. The first voltage threshold is greater than or equal to the second voltage threshold. The first voltage threshold and the second voltage threshold are related to a voltage value of the power grid and a current value of an output end. The first photovoltaic inverter may also monitor a power generation status of a first photovoltaic string by using a control module.

The energy storage system may further include a controller, the controller is coupled to each of the Y photovoltaic inverters, the controller is coupled to each of the N energy storage converters, and the controller is configured to communicate with the Y photovoltaic inverters and the N energy storage converters. (FIG. 4A and FIG. 4B use an example in which the controller is connected to the first photovoltaic inverter, a $Y^{th}$ photovoltaic inverter, and the first energy storage converter, but is not limited thereto.) Specifically, the controller may communicate with control modules in the Y photovoltaic inverters and control modules in the N energy storage converters. The controller may communicate with the Y photovoltaic inverters and the N energy storage converters, so that the controller can detect power generation statuses of the X photovoltaic strings by using the Y photovoltaic inverters, and can detect quantities of electricity of the M cell strings by using the N energy storage converters.

The controller may receive, through a cable or wirelessly, real-time grid feed-in power delivered by a power grid corporation or an optical power storage station, and detect total power of the Y photovoltaic inverters. When the controller detects that the total power of the Y photovoltaic inverters is greater than or equal to the grid feed-in power, the controller controls the N energy storage converters to charge the M cell strings; and when the controller detects that the total power of the Y photovoltaic inverters is less than the grid feed-in power, the controller controls, by using the N energy storage converters, the M cell strings to discharge. When the controller detects that the total power of the Y photovoltaic inverters is greater than or equal to the grid feed-in power, it indicates that the total output power of the Y photovoltaic inverters is excessively high, energy generated by the Y photovoltaic inverters may be stored, and the controller may control the N energy storage converters to charge the M cell strings. When the controller detects that the total output power of the Y photovoltaic inverters is less than the grid feed-in power, the controller may control, by using the N energy storage converters, the M cell strings to discharge, to compensate for a shortage of the output power of the photovoltaic inverters.

When an output voltage frequency of any one of the N energy storage converters or the Y photovoltaic inverters is greater than a first preset voltage frequency threshold, each of the Y photovoltaic inverters performs output with reduced power based on a preset power curve of the photovoltaic inverter, and the N energy storage converters charge the M cell strings; and when an output end voltage frequency of any one of the N energy storage converters or the Y photovoltaic inverters is less than a second preset voltage frequency threshold, each of the Y photovoltaic inverters performs output with increased power based on a preset power curve of the photovoltaic inverter, and the N energy storage converters control the M cell strings to discharge. The first preset voltage frequency threshold is greater than a preset power grid voltage normal frequency value, and the second preset voltage frequency threshold is less than the preset power grid voltage normal frequency value. In this way, power of the photovoltaic inverter can fall within a normal range.

The controller is further configured to obtain a quantity of electricity of each of the M cell strings by using the N energy storage converters; when the N energy storage converters charge the M cell strings, the controller controls the N energy storage converters to preferentially charge a cell string with a small quantity of electricity in the M cell strings; and when the M cell strings discharge, the controller preferentially controls, by using the N energy storage converters, a cell string with a large quantity of electricity in the M cell strings to discharge. In this way, the cell string with a small quantity of electricity can be preferentially charged, and the cell string with a large quantity of electricity can preferentially discharge, so that quantities of electricity of all of the cell strings can be kept balanced to the greatest extent.

The energy storage system may further include a meter, the meter may be connected to second ends of the N energy storage converters, and the meter is configured to measure amount of charging electricity and amount of discharging electricity of the N energy storage converters. For details, refer to FIG. 4A and FIG. 4B. An output end of the first photovoltaic inverter is connected to a meter A, and the meter A may measure a power yield of a photovoltaic string corresponding to the first photovoltaic inverter. An output end of the $Y^{th}$ photovoltaic inverter is connected to a meter B, and the meter B may measure a power yield of a photovoltaic string corresponding to the $Y^{th}$ photovoltaic inverter. The first energy storage converter may be connected to a meter C, and the meter C may measure an amount of charging electricity and an amount of discharging electricity of the first energy storage converter. The $N^{th}$ energy storage converter may be connected to a meter D, and the meter D may measure an amount of charging electricity and an amount of discharging electricity of the $N^{th}$ energy storage converter. In the energy storage system, a location at which the meter is disposed is not limited. A meter may be connected to a second end of each energy storage converter to measure an amount of charging electricity and an amount of discharging electricity of the energy storage converter, or only one meter may be disposed to measure amount of charging electricity and amount of discharging electricity of all the energy storage converters. All meters in the energy storage system can communicate with the controller.

Refer to FIG. 3 and FIG. 4A and FIG. 4B. In the energy storage system, one DC/DC conversion unit may be connected to only one or more cell strings. Optimally, in the energy storage system, one DC/DC conversion unit is connected to one cell string. If a DC/DC conversion unit is connected to a plurality of cell strings connected in parallel, a consistency requirement for the cell strings connected in parallel is relatively high. When the DC/DC conversion unit is connected to only one cell string, consistency of the cell string is relatively low.

A second end of the energy storage converter in the energy storage system may be coupled to the power grid by using a transformer. A low-voltage winding of the transformer is connected to the photovoltaic inverter and the energy storage converter, and a high-voltage winding of the transformer is connected to the power grid. A voltage of the power grid may be a three-phase alternating current of 10 kV, 35 kV, and 110 kV, and an output end voltage of the low-voltage winding may be a phase alternating current voltage of 0.4 kV, 0.48 kV, 0.6 kV, and 0.8 kV.

Optionally, in an energy storage converter in the energy storage system, a DC/DC conversion unit may be connected in series to a switch, and is connected to a cell string by using a first end of the energy storage converter; and the DC/AC conversion unit may be connected in series to a switch, and may be connected to a low-voltage winding by using a DC/AC power conversion device and the first transformer.

The energy storage converter described in Embodiment 1 may be a string direct current energy storage converter, a string alternating current energy storage converter, a two-stage string energy storage converter, a string PCS, a two-stage PCS, or a DC/AC PCS.

Embodiment 1 provides an energy storage system. The energy storage system includes M cell strings and N energy storage converters, a first end of any one of the N energy storage converters is coupled to at least one of the M cell strings, a second end of the any energy storage converter is configured to connect to a power grid, M and N are integers greater than 0, and M≥N; a first end of a first energy storage converter is coupled to Q cell strings in the M cell strings, the first energy storage converter includes a direct current/alternating current DC/AC conversion unit and at least one DC/DC conversion unit, Q is an integer greater than 0, Q≤M, and the first energy storage converter is any one of the N energy storage converters; a first DC/DC conversion unit is coupled to at least one of the Q cell strings by using the first end of the first energy storage converter, the first DC/DC conversion unit is coupled to the DC/AC conversion unit, the DC/AC conversion unit is coupled to the power grid by using a second end of the first energy storage converter, and the first DC/DC conversion unit is any one of the at least one DC/DC conversion unit; and the first DC/DC conversion unit is configured to perform adaptation between a voltage of the DC/AC conversion unit and a voltage of at least one of the Q cell strings. The DC/DC conversion unit in the energy storage system may perform adaptation between a voltage of the DC/AC conversion unit and a voltage of a cell string, so that a cell capacity can be fully used, and a waste of the cell capacity can be reduced.

In Embodiment 1, the energy storage converter in the energy storage system may be divided into an independent DC/DC power conversion device and an independent DC/AC power conversion device. For details, refer to FIG. 5.

Embodiment 2 provides another energy storage system. The energy storage system includes M cell strings, N direct current/alternating current DC/DC power conversion devices, and at least one DC/AC power conversion device. A first end of any one of the N DC/DC power conversion devices is coupled to at least one of the M cell strings, a second end of the any DC/DC power conversion device is coupled to a first end of one of the at least one DC/AC power conversion device, a second end of the DC/AC power conversion device is configured to connect to a power grid, M and N are integers greater than 0, and M≥N.

Figure 5:
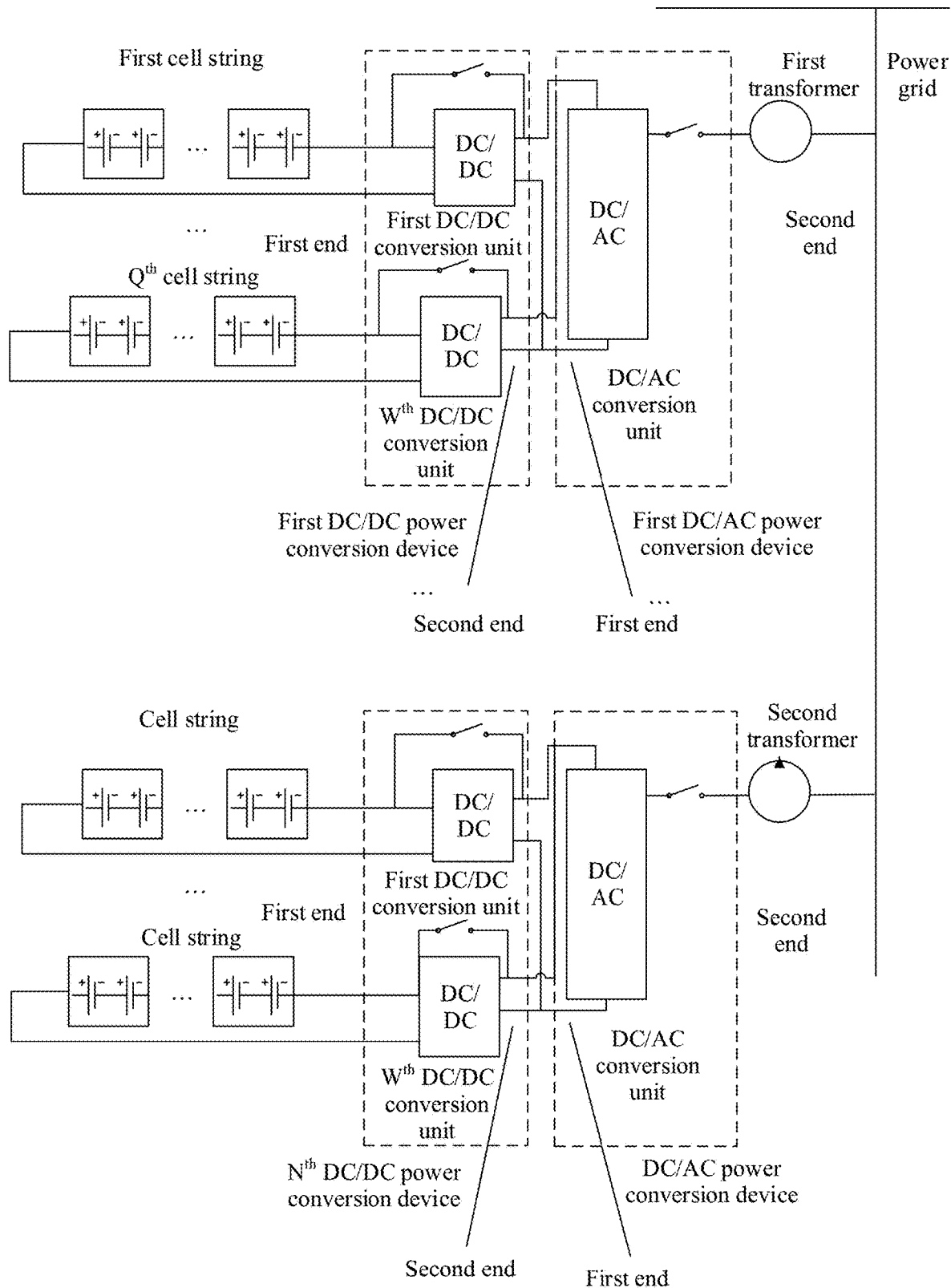
FIG. 5 is a schematic diagram of an embodiment of an energy storage system according to this application.

As shown in FIG. 5, there are N DC/DC power conversion devices from a first DC/DC power conversion device to an $N^{th}$ DC/DC power conversion device, and there is at least one DC/AC power conversion device. The first DC/DC power conversion device is any one of the N DC/DC power conversion devices, and a first DC/AC power conversion device is one of the at least one DC/AC power conversion device.

A first end of the first DC/DC power conversion device is coupled to Q cell strings in the M cell strings, and the first DC/DC power conversion device includes at least one DC/DC conversion unit. (FIG. 5 uses an example in which the first DC/DC power conversion device includes a first DC/DC conversion unit and a second DC/DC power conversion unit, but is not limited thereto.) Q is an integer greater than 0, and Q≤M.

Any DC/DC conversion unit in the first DC/DC power conversion device is coupled to at least one of the Q cell strings by using the first end of the first DC/DC power conversion device. (FIG. 5 uses an example in which the first DC/DC conversion unit is coupled to a first cell string by using the first end of the first DC/DC power conversion device and a $W^{th}$ DC/DC conversion unit is coupled to a $Q^{th}$ cell string by using the first end of the first energy storage converter, but is not limited thereto.)

Any DC/DC conversion unit in the first DC/DC power conversion device is coupled to a first end of one of the at least one DC/AC power conversion device by using a second end of the first DC/DC power conversion device. (FIG. 5 uses an example in which both the first DC/DC conversion unit and the $W^{th}$ DC/DC conversion unit are connected to the first end of the first DC/AC power conversion device by using the second end of the first DC/DC power conversion device, but is not limited thereto.)

The DC/DC conversion unit in the energy storage system is configured to perform adaptation between a voltage of a DC/AC conversion unit and a voltage of a cell string. (As shown in FIG. 5, the first DC/DC conversion unit in the energy storage system is configured to perform adaptation between the voltage of the DC/AC conversion unit and a voltage of the first cell string, and the $W^{th}$ DC/DC conversion unit is configured to perform adaptation between the voltage of the DC/AC conversion unit and a voltage of the $Q^{th}$ cell string.) Therefore, a cell capacity can be fully used, and a waste of the cell capacity can be reduced.

It should be noted that in the energy storage system, a positive port of each DC/DC conversion unit is coupled to a positive port of a cell string, and a negative port of each DC/DC conversion unit is connected to a negative port of the cell string.

The energy storage system further includes a first transformer, and a second end of the at least one DC/AC power conversion device included in the energy storage system is coupled to the power grid by using the first transformer. (FIG. 5 uses only an example in which a second end of the first DC/AC power conversion device is connected to the power grid by using the first transformer.) The first transformer may perform adaptation between an output voltage of the DC/AC power conversion device and a voltage of the power grid, so that electric energy of the photovoltaic energy storage system can be transported to the power grid, or the photovoltaic energy storage system can store electric energy of the power grid.

Figure 6:
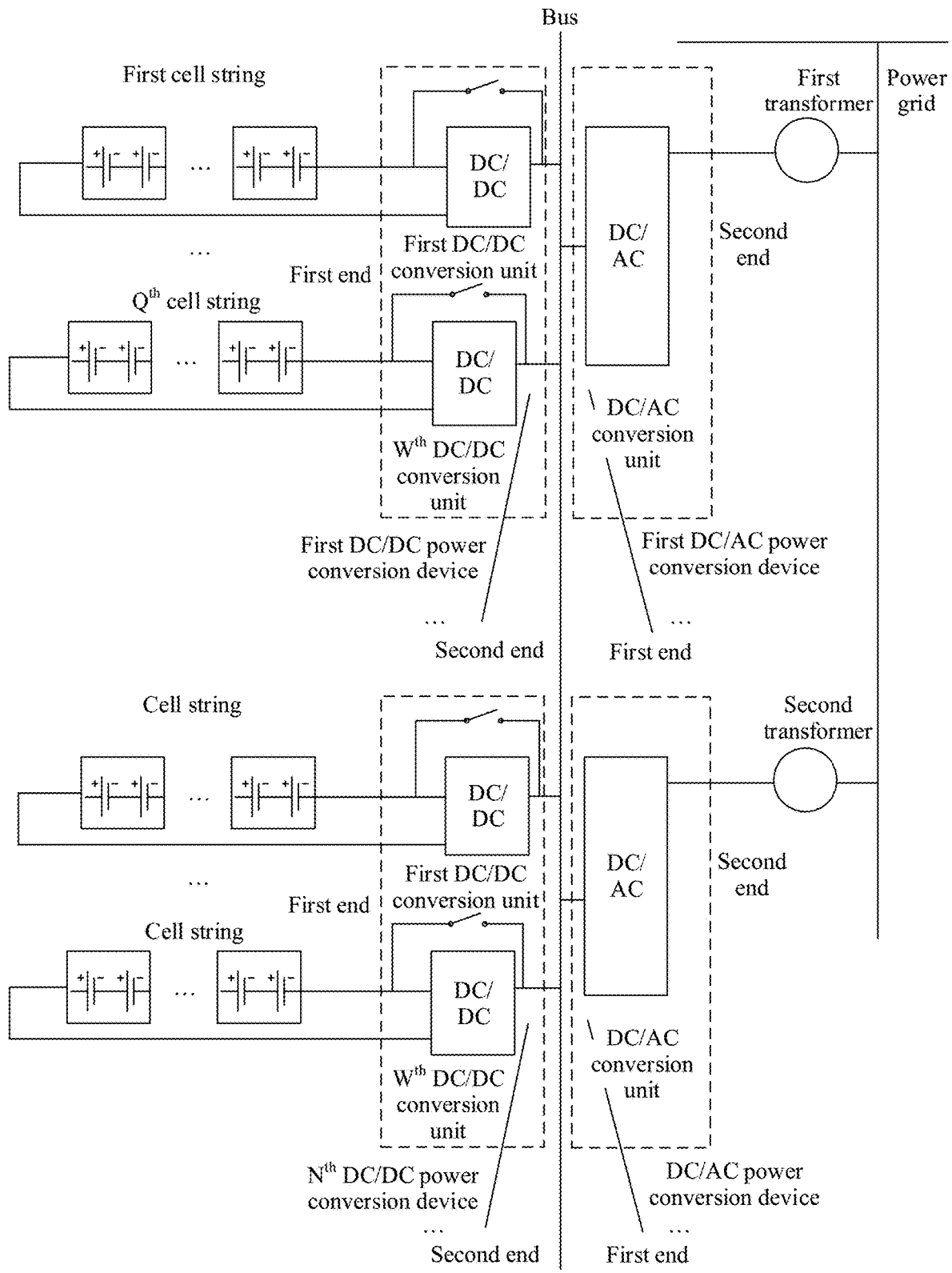
FIG. 6 is a schematic diagram of an embodiment of an energy storage system according to this application.

In an implementation, the N DC/DC power conversion devices in the energy storage system may be connected to the at least one DC/AC power conversion device through a bus. Each of the N DC/DC power conversion devices and the at least one DC/AC power conversion device may be connected to the bus by using a switch. For details, refer to FIG. 6 for understanding. Details are not described herein.

Figure 7B:
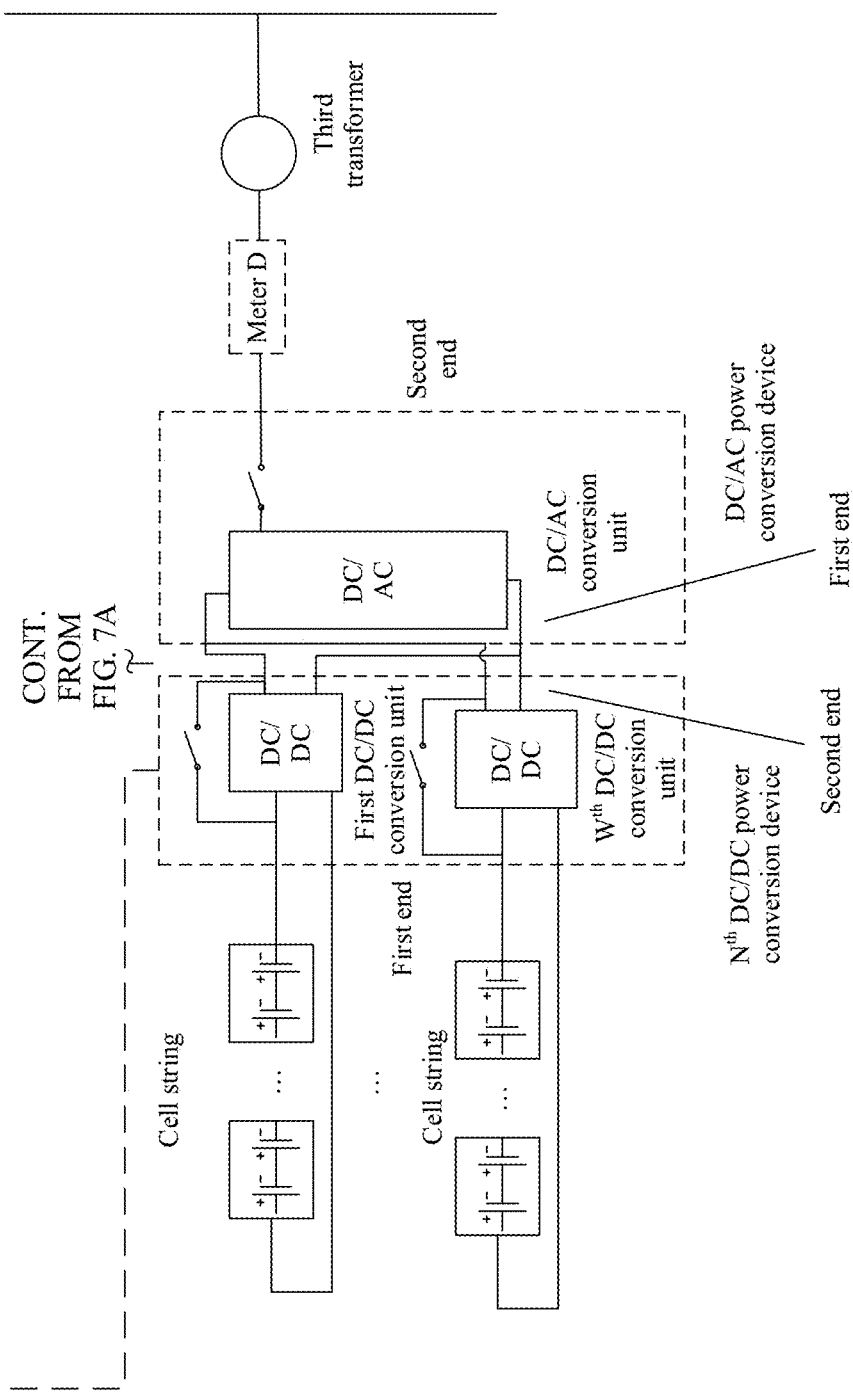

It may be understood that the energy storage system shown in FIG. 5 may further include a photovoltaic string and a photovoltaic inverter, so that the energy storage system can be used as a photovoltaic energy storage system. For details, refer to FIG. 7A and FIG. 7B. FIG. 7A and FIG. 7B are based on FIG. 5. On the basis of FIG. 5, the energy storage system may further include X photovoltaic strings and Y photovoltaic inverters, an input end of any one of the Y photovoltaic inverters is coupled to an output end of at least one of the X photovoltaic strings, output ends of the Y photovoltaic inverters are coupled to the second end of the at least one DC/AC power conversion device, and X and Y are integers greater than 0. (FIG. 7A and FIG. 7B use an example in which one photovoltaic string is connected to one photovoltaic inverter, but is not limited thereto.) The photovoltaic string may convert light energy into a direct current, and the photovoltaic inverter converts the direct current into an alternating current, so that the alternating current can be transported to the power grid, or can be converted into a direct current by using the energy storage converter for storage in the cell string. In this way, the energy storage system can transport electric energy to the power grid, and can also store electric energy in the cell string.

Refer to FIG. 7A and FIG. 7B. The energy storage system may further include a second transformer, and an output end of any one of the Y photovoltaic inverters is connected to the power grid by using the second transformer. The second transformer may perform adaptation between an output end voltage of the photovoltaic inverter and a voltage of the power grid, so that electric energy generated by the photovoltaic string can be transported to the power grid.

In the energy storage system, both ends of any DC/DC conversion unit may be further connected in parallel to a switch. (Both ends of each of the first DC/DC conversion unit and the $W^{th}$ DC/DC conversion unit in FIG. 5 and FIG. 7A and FIG. 7B are connected in parallel to a switch.) If a voltage of the cell string and a voltage of the DC/AC power conversion device are adaptable, the switch connected in parallel to both ends of the DC/DC conversion unit may be closed, so that the DC/DC conversion unit can be short-circuited. In this way, unnecessary energy consumption can be reduced. If a voltage of the cell string and a voltage of the DC/AC power conversion device are not adaptable, the switch connected in parallel to both ends of the DC/DC conversion unit is open, and the DC/DC conversion unit performs adaptation between the voltage of the cell string and the voltage of the DC/AC power conversion device.

It should be noted that a control module may be disposed in the DC/DC power conversion device in the energy storage system, and the control module may monitor a voltage of a cell string connected to the DC/DC power conversion device. The DC/DC power conversion device is configured to detect the voltage of the cell string connected to the DC/DC power conversion device. For example, in FIG. 5 and FIG. 7A and FIG. 7B, the first DC/DC power conversion device may detect voltages of the Q cell strings connected to the first DC/DC power conversion device. When a voltage of any one of the Q cell strings is greater than or equal to a first voltage threshold, a switch connected in parallel to a DC/DC conversion unit coupled to the cell string whose voltage is greater than or equal to the first voltage threshold is closed; and when a voltage of any one of the Q cell strings is less than or equal to a second voltage threshold, a switch connected in parallel to a DC/DC conversion unit whose voltage is less than or equal to the second voltage threshold is open. The first voltage threshold is greater than or equal to the second voltage threshold. The first voltage threshold and the second voltage threshold are related to a voltage value of the power grid and a current value of an output end.

The energy storage system may further include a controller, the controller is coupled to each of the Y photovoltaic inverters, the controller is coupled to each of the N DC/DC power conversion devices, and the controller is configured to communicate with the Y photovoltaic inverters and the N DC/DC power conversion devices. (FIG. 7A and FIG. 7B use an example in which the controller is connected to a first photovoltaic inverter and the first DC/DC power conversion device, but is not limited thereto.) The controller may communicate with the Y photovoltaic inverters and the N DC/DC power conversion devices, so that the controller can detect power generation statuses of the X photovoltaic strings by using the Y photovoltaic inverters, and can detect quantities of electricity of the M cell strings by using the N DC/DC power conversion devices. Specifically, the controller may communicate with control modules in the Y photovoltaic inverters and control modules in the N DC/DC power conversion devices.

The controller may receive, through a cable or wirelessly, real-time grid feed-in power delivered by a power grid corporation or an optical power storage station, and detect total power of the Y photovoltaic inverters. When the controller detects that the total power of the Y photovoltaic inverters is greater than or equal to the grid feed-in power, the controller controls the N DC/DC power conversion devices to charge the M cell strings; and when the controller detects that the total power of the Y photovoltaic inverters is less than the grid feed-in power, the controller controls, by using the N DC/DC power conversion devices, the M cell strings to discharge. When the controller detects that the total power of the Y photovoltaic inverters is greater than or equal to the grid feed-in power, it indicates that the total output power of the Y photovoltaic inverters is excessively high, energy generated by the Y photovoltaic inverters may be stored, and the controller may control the N energy storage converters to charge the M cell strings. When the controller detects that the total output power of the Y photovoltaic inverters is less than the grid feed-in power, the controller may control, by using the N energy storage converters, the M cell strings to discharge, to compensate for a shortage of the output power of the photovoltaic inverters.

When an output voltage frequency of any one of the N DC/DC power conversion devices or the Y photovoltaic inverters is greater than a first preset voltage frequency threshold, each of the Y photovoltaic inverters performs output with reduced power based on a preset power curve of the photovoltaic inverter, and the N DC/DC power conversion devices charge the M cell strings; and when an output end voltage frequency of any one of the N DC/DC power conversion devices or the Y photovoltaic inverters is less than a second preset voltage frequency threshold, each of the Y photovoltaic inverters performs output with increased power based on a preset power curve of the photovoltaic inverter, and the N DC/DC power conversion devices control the M cell strings to discharge. The first preset voltage frequency threshold is greater than a preset power grid voltage normal frequency value, and the second preset voltage frequency threshold is less than the preset power grid voltage normal frequency value. In this way, power of the photovoltaic inverter can fall within a normal range.

The controller is further configured to obtain a quantity of electricity of each of the M cell strings by using the N DC/DC power conversion devices; when the N DC/DC power conversion devices charge the M cell strings, the controller controls the N DC/DC power conversion devices to preferentially charge a cell string with a small quantity of electricity in the M cell strings; and when the M cell strings discharge, the controller preferentially controls, by using the N DC/DC power conversion devices, a cell string with a large quantity of electricity in the M cell strings to discharge. In this way, the cell string with a small quantity of electricity can be preferentially charged, and the cell string with a large quantity of electricity can preferentially discharge, so that quantities of electricity of all of the cell strings can be kept balanced to the greatest extent.

The energy storage system further includes a meter, the meter is configured to connect to second ends of the N DC/DC power conversion devices, and the meter is configured to measure amount of charging electricity and amount of discharging electricity of the N DC/DC power conversion devices. Specifically, in FIG. 7A and FIG. 7B, a meter C is connected to the second end of the first DC/AC power conversion device, and may measure amount of charging electricity and amount of discharging electricity of the Q cell strings connected to the first DC/DC power conversion device. It should be noted that the meter may be alternatively directly disposed on a second end of the DC/DC power conversion device. An output end of the first photovoltaic inverter is connected to a meter A, and the meter A may measure a power yield of a photovoltaic string corresponding to the first photovoltaic inverter. An output end of the $Y^{th}$ photovoltaic inverter may be connected to a meter B, and the meter B may measure a power yield of a photovoltaic string corresponding to the $Y^{th}$ photovoltaic inverter. In the energy storage system, a location at which the meter is disposed is not limited. A meter may be connected to a second end of each energy storage converter to measure an amount of charging electricity and an amount of discharging electricity of the energy storage converter, or only one meter may be disposed to measure amount of charging electricity and amount of discharging electricity of all energy storage converters. All meters in the energy storage system can communicate with the controller.

Refer to FIG. 5, FIG. 6, and FIG. 7A and FIG. 7B. In the energy storage system, one DC/DC conversion unit may be connected to one or more cell strings. Optimally, the one DC/DC conversion unit may be connected to only one cell string. If a DC/DC conversion unit is connected to a plurality of cell strings connected in parallel, a consistency requirement for the cell strings connected in parallel is relatively high. When the DC/DC conversion unit is connected to only one cell string, consistency of the cell string is relatively low.

A second end of the DC/AC power conversion device in the energy storage system may be coupled to the power grid by using a transformer. A low-voltage winding of the transformer is connected to the photovoltaic inverter and the energy storage converter, and a high-voltage winding of the transformer is connected to the power grid. A voltage of the power grid may be a three-phase alternating current of 10 kV, 35 kV, and 110 kV, and an output end voltage of the low-voltage winding may be an alternating current voltage of 0.4 kV, 0.48 kV, 0.6 kV, and 0.8 kV.

Optionally, in the energy storage system, the DC/DC conversion unit may be connected in series to a switch, and is connected to a cell string by using a first end of the DC/DC power conversion device; and the DC/AC conversion unit may be connected in series to a switch, and may be connected to a low-voltage winding by using a DC/AC power conversion device and the first transformer.

Embodiment 2 provides an energy storage system. The energy storage system includes M cell strings, N direct current/alternating current DC/DC power conversion devices, and at least one DC/AC power conversion device, a first end of any one of the N DC/DC power conversion devices is coupled to at least one of the M cell strings, a second end of the any DC/DC power conversion device is coupled to a first end of one of the at least one DC/AC power conversion device, a second end of the DC/AC power conversion device is configured to connect to a power grid, M and N are integers greater than 0, and M≥N; a first end of a first DC/DC power conversion device is coupled to Q cell strings in the M cell strings, the first DC/DC power conversion device includes at least one DC/DC conversion unit, the first DC/DC power conversion device is any one of the N DC/DC power conversion devices, Q is an integer greater than 0, and Q≤M; a first DC/DC conversion unit is coupled to at least one of the Q cell strings by using the first end of the first DC/DC power conversion device, the first DC/DC conversion unit is coupled to a first end of one of the at least one DC/AC power conversion device by using a second end of the first DC/DC power conversion device, and the first DC/DC conversion unit is any one of the at least one DC/DC conversion unit; and the first DC/DC conversion unit is configured to perform adaptation between a voltage of one of the at least one DC/AC power conversion device and a voltage of at least one of the Q cell strings. The DC/DC power conversion device in the energy storage system may perform adaptation between a voltage of a DC/AC power conversion device and a voltage of a cell string, so that a cell capacity can be fully used, and a waste of the cell capacity can be reduced.

Figure 8B:
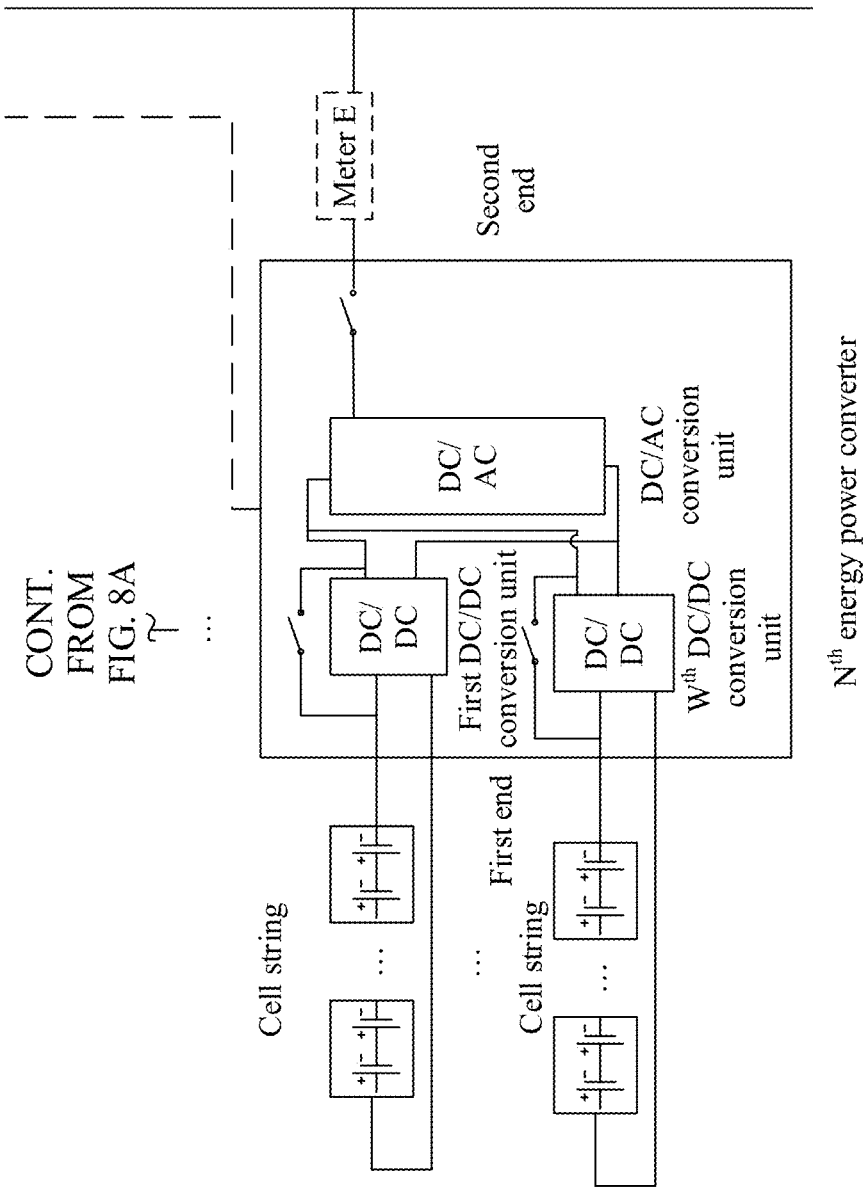

Embodiment 3 provides a photovoltaic energy storage system. Refer to FIG. 8A and FIG. 8B. The photovoltaic energy storage system includes M cell strings, N energy storage converters, X photovoltaic strings, and Y photovoltaic inverters, a first end of any one of the N energy storage converters is coupled to at least one of the M cell strings, and a second end of the any energy storage converter is configured to connect to a power grid. In FIG. 8A and FIG. 8B, a first energy storage converter is any one of the N energy storage converters. An input end of any one of the Y photovoltaic inverters is coupled to an output end of at least one of the X photovoltaic strings, output ends of the Y photovoltaic inverters are coupled to second ends of the N energy storage converters, M and N are integers greater than 0, M≥N, and X and Y are integers greater than 0. FIG. 8A and FIG. 8B use an example in which one cell string is connected to one photovoltaic inverter. (A first photovoltaic string is connected to a first photovoltaic inverter, and an $X^{th}$ photovoltaic string is connected to a $Y^{th}$ photovoltaic inverter.) However, this is not limited.

A first end of the first energy storage converter is coupled to Q cell strings in the M cell strings, and the first energy storage converter includes a direct current/alternating current DC/AC conversion unit and at least one direct current/direct current DC/DC conversion unit. (FIG. 8A and FIG. 8B use an example in which the first energy storage converter includes two DC/DC conversion units: a first DC/DC conversion unit and a $W^{th}$ DC/DC conversion unit, but is not limited thereto.) Q is an integer greater than 0, and Q≤M.

Any DC/DC conversion unit in the first energy storage converter is coupled to at least one of the Q cell strings by using the first end of the first energy storage converter. (FIG. 8A and FIG. 8B use an example in which the first DC/DC conversion unit is connected to a first cell string by using the first end of the first energy storage converter and the $W^{th}$ DC/DC conversion unit is connected to a $Q^{th}$ cell string by using the first end of the first energy storage converter, but is not limited thereto.) Any DC/DC conversion unit in the first energy storage converter is coupled to the DC/AC conversion unit. (FIG. 8A and FIG. 8B use an example in which both the first DC/DC conversion unit and the $W^{th}$ DC/DC conversion unit are coupled to the DC/AC conversion unit, but is not limited thereto.) The DC/AC conversion unit is coupled to the power grid by using a second end of the first energy storage converter.

The DC/DC conversion unit in the photovoltaic energy storage system is configured to perform adaptation between a voltage of the DC/AC conversion unit and a voltage of a cell string. (As shown in FIG. 8A and FIG. 8B, the first DC/DC conversion unit in the photovoltaic energy storage system is configured to perform adaptation between the voltage of the DC/AC conversion unit and a voltage of the first cell string, and the $W^{th}$ DC/DC conversion unit is configured to perform adaptation between the voltage of the DC/AC conversion unit and a voltage of the $Q^{th}$ cell string.) Therefore, a cell capacity can be fully used, and a waste of the cell capacity can be reduced.

In addition, in the photovoltaic energy storage system, a charging path includes a photovoltaic string, a photovoltaic inverter, an energy storage converter, and a cell string, and a discharging path includes a cell string and an energy storage converter. Neither the charging path nor the discharging path includes a transformer, so that the charging path and the discharging path of the photovoltaic energy storage system can be shortened, thereby improving charging and discharging efficiency of a cell.

It should be noted that in the energy storage system, a positive port of each DC/DC conversion unit is coupled to a positive port of a cell string, and a negative port of each DC/DC conversion unit is connected to a negative port of the cell string.

The photovoltaic energy storage system may further include a first transformer, and second ends of the N energy storage converters included in the photovoltaic energy storage system may be coupled to the power grid by using the first transformer. (FIG. 8A and FIG. 8B use only an example in which the second end of the first energy storage converter is connected to the power grid by using the first transformer, but is not limited thereto.) The first transformer may perform adaptation between a voltage of the energy storage converter and a voltage of the power grid, so that electric energy of the energy storage system can be transported to the power grid, or the energy storage system can store electric energy of the power grid.

It should be noted that a first end of the energy storage converter in the photovoltaic energy storage system is configured to connect to a cell string, a second end is configured to connect to the power grid, and the first end and the second end may serve as an input end or an output end in different cases. Specifically, during charging, the first end of the energy storage converter is an output end, and the second end is an input end, and during discharging, the first end of the energy storage converter is an input end, and the second end is an output end. The second end may also be connected to any electric appliance, and the photovoltaic energy storage system may be used as a power source to supply power to the electric appliance.

Both ends of a DC/DC conversion unit in any one of the energy storage converters in the photovoltaic energy storage system are connected in parallel to a switch. (Both ends of each of the first DC/DC conversion unit and the $W^{th}$ DC/DC conversion unit in FIG. 8A and FIG. 8B are connected in parallel to a switch.) If a voltage of the cell string and a voltage of the energy storage converter are adaptable, the switch connected in parallel to both ends of the DC/DC conversion unit may be closed, so that the DC/DC conversion unit can be short-circuited. In this way, unnecessary energy consumption can be reduced. If a voltage of the cell string and a voltage of the energy storage converter are not adaptable, the switch connected in parallel to both ends of the DC/DC conversion unit is open, and the DC/DC conversion unit performs adaptation between the voltage of the cell string and the voltage of the energy storage converter.

It should be noted that in the photovoltaic energy storage system, control modules may be disposed in the energy storage converter and the photovoltaic inverter. The control module in the energy storage converter may monitor a voltage of a cell string connected to the energy storage converter, and the control module in the photovoltaic string may monitor a power generation status of the photovoltaic string. The energy storage converter is configured to detect the voltage of the cell string connected to the energy storage converter. For example, in FIG. 8A and FIG. 8B, the first energy storage converter may detect voltages of the Q cell strings connected to the first energy storage converter. When a voltage of any one of the Q cell strings is greater than or equal to a first voltage threshold, a switch connected in parallel to a DC/DC conversion unit coupled to the cell string whose voltage is greater than or equal to the first voltage threshold is closed; and when a voltage of any one of the Q cell strings is less than or equal to a second voltage threshold, a switch connected in parallel to a DC/DC conversion unit connected to the cell string whose voltage is less than or equal to the second voltage threshold is open. The first voltage threshold is greater than or equal to the second voltage threshold. The first voltage threshold and the second voltage threshold are related to a voltage value of the power grid and a current value of an output end. The first photovoltaic inverter may detect a power generation status of the first photovoltaic string.

The photovoltaic energy storage system may further include a controller, the controller is coupled to each of the Y photovoltaic inverters, the controller is coupled to each of the N energy storage converters, and the controller is configured to communicate with the Y photovoltaic inverters and the N energy storage converters. (FIG. 8A and FIG. 8B use an example in which the controller is connected to the first photovoltaic inverter, the $Y^{th}$ photovoltaic inverter, and the first energy storage converter, but is not limited thereto.) The controller may communicate with the Y photovoltaic inverters and the N energy storage converters, so that the controller can detect power generation statuses of the X photovoltaic strings by using the Y photovoltaic inverters, and can detect quantities of electricity of the M cell strings by using the N energy storage converters. Specifically, the controller may communicate with control modules in the Y photovoltaic inverters and control modules in the N energy storage converters.

The controller may receive, through a cable or wirelessly, real-time grid feed-in power delivered by a power grid corporation or an optical power storage station, and detect total power of the Y photovoltaic inverters. When the controller detects that the total power of the Y photovoltaic inverters is greater than or equal to the grid feed-in power, the controller controls the N energy storage converters to charge the M cell strings; and when the controller detects that the total power of the Y photovoltaic inverters is less than the grid feed-in power, the controller controls, by using the N energy storage converters, the M cell strings to discharge. When the controller detects that the total power of the Y photovoltaic inverters is greater than or equal to the grid feed-in power, it indicates that the total output power of the Y photovoltaic inverters is excessively high, energy generated by the Y photovoltaic inverters may be stored, and the controller may control the N energy storage converters to charge the M cell strings. When the controller detects that the total output power of the Y photovoltaic inverters is less than the grid feed-in power, the controller may control, by using the N energy storage converters, the M cell strings to discharge, to compensate for a shortage of the output power of the photovoltaic inverters.

When an output voltage frequency of any one of the N energy storage converters or the Y photovoltaic inverters is greater than a first preset voltage frequency threshold, each of the Y photovoltaic inverters performs output with reduced power based on a preset power curve of the photovoltaic inverter, and the N energy storage converters charge the M cell strings; and when an output end voltage frequency of any one of the N energy storage converters or the Y photovoltaic inverters is less than a second preset voltage frequency threshold, each of the Y photovoltaic inverters performs output with increased power based on a preset power curve of the photovoltaic inverter, and the N energy storage converters control the M cell strings to discharge. The first preset voltage frequency threshold is greater than a preset power grid voltage normal frequency value, and the second preset voltage frequency threshold is less than the preset power grid voltage normal frequency value. In this way, power of the photovoltaic inverter can fall within a normal range.

The controller is further configured to obtain a quantity of electricity of each of the M cell strings by using the N energy storage converters; when the N energy storage converters charge the M cell strings, the controller controls the N energy storage converters to preferentially charge a cell string with a small quantity of electricity in the M cell strings; and when the M cell strings discharge, the controller preferentially controls, by using the N energy storage converters, a cell string with a large quantity of electricity in the M cell strings to discharge. In this way, the cell string with a small quantity of electricity can be preferentially charged, and the cell string with a large quantity of electricity can preferentially discharge, so that quantities of electricity of all of the cell strings can be kept balanced to the greatest extent.

A second end of the energy storage converter in the photovoltaic energy storage system may be coupled to the power grid by using a transformer. A low-voltage winding of the transformer is connected to the photovoltaic inverter and the energy storage converter, and a high-voltage winding of the transformer is connected to the power grid. A voltage of the power grid may be a three-phase alternating current of 10 kV, 35 kV, and 110 kV, and an output end voltage of the low-voltage winding may be an alternating current voltage of 0.4 kV, 0.48 kV, 0.6 kV, and 0.8 kV.

The photovoltaic energy storage system may further include a meter, the meter may be connected to second ends of the N energy storage converters, and the meter is configured to measure amount of charging electricity and amount of discharging electricity of the N energy storage converters. For details, refer to FIG. 8A and FIG. 8B. An output end of the first photovoltaic inverter is connected to a meter A, and the meter A may measure a power yield of a photovoltaic string corresponding to the first photovoltaic inverter. An output end of the $Y^{th}$ photovoltaic inverter is connected to a meter B, and the meter B may measure a power yield of a photovoltaic string corresponding to the $Y^{th}$ photovoltaic inverter. The first energy storage converter may be connected to a meter C, and the meter C may measure an amount of charging electricity and an amount of discharging electricity of the first energy storage converter. An output end of the first transformer is connected to a meter D, and the meter D may measure a power yield generated by the photovoltaic energy storage system. An output end of an $N^{th}$ photovoltaic energy storage system is connected to a meter E, and the meter E may measure an amount of charging electricity and an amount of discharging electricity of the $N^{th}$ energy storage converter. In the energy storage system, a location at which the meter is disposed is not limited. A meter may be connected to a second end of each energy storage converter to measure an amount of charging electricity and an amount of discharging electricity of the energy storage converter, or only one meter may be disposed to measure amount of charging electricity and amount of discharging electricity of all the energy storage converters. All meters in the photovoltaic energy storage system can communicate with the controller.

Refer to FIG. 8A and FIG. 8B. In the photovoltaic energy storage system, one DC/DC conversion unit may be connected to only one or more cell strings. Optimally, in the photovoltaic energy storage system, one DC/DC conversion unit is connected to one cell string. If a DC/DC conversion unit is connected to a plurality of cell strings connected in parallel, a consistency requirement for the cell strings connected in parallel is relatively high. When the DC/DC conversion unit is connected to only one cell string, consistency of the cell string is relatively low.

A second end of the energy storage converter in the photovoltaic energy storage system may be coupled to the power grid by using a transformer. A low-voltage winding of the transformer is connected to the photovoltaic inverter and the energy storage converter, and a high-voltage winding of the transformer is connected to the power grid. A voltage of the power grid may be a three-phase alternating current of 10 kV, 35 kV, and 110 kV, and an output end voltage of the low-voltage winding may be an alternating current voltage of 0.4 kV, 0.48 kV, 0.6 kV, and 0.8 kV.

Optionally, in the energy storage converter in the photovoltaic energy storage system, the DC/DC conversion unit may be connected in series to a switch, and is connected to a cell string by using a first end of the energy storage converter; and the DC/AC conversion unit may be connected in series to a switch, and may be connected to a low-voltage winding by using a DC/AC power conversion device and the first transformer.

Embodiment 3 provides a photovoltaic energy storage system. The photovoltaic energy storage system includes M cell strings, N energy storage converters, X photovoltaic strings, and Y photovoltaic inverters, a first end of any one of the N energy storage converters is coupled to at least one of the M cell strings, a second end of the any energy storage converter is configured to connect to a power grid, an input end of any one of the Y photovoltaic inverters is coupled to an output end of at least one of the X photovoltaic strings, output ends of the Y photovoltaic inverters are coupled to second ends of the N energy storage converters, M and N are integers greater than 0, M≥N, and X and Y are integers greater than 0; a first end of a first energy storage converter is coupled to Q cell strings in the M cell strings, the first energy storage converter includes a direct current/alternating current DC/AC conversion unit and at least one direct current/direct current DC/DC conversion unit, Q is an integer greater than 0, Q≤M, and the first energy storage converter is any one of the N energy storage converters; a first DC/DC conversion unit is coupled to at least one of the Q cell strings by using the first end of the first energy storage converter, the first DC/DC conversion unit is coupled to the DC/AC conversion unit, the DC/AC conversion unit is coupled to the power grid by using a second end of the first energy storage converter, and the first DC/DC conversion unit is any one of the at least one DC/DC conversion unit; and the first DC/DC conversion unit is configured to perform adaptation between a voltage of the DC/AC conversion unit and a voltage of at least one of the Q cell strings.

The DC/DC conversion unit in the photovoltaic energy storage system may perform adaptation between the voltage of the DC/AC conversion unit and a voltage of a cell string, so that a cell capacity can be fully used, and a waste of the cell capacity can be reduced. In addition, in the photovoltaic energy storage system, neither the charging path nor the discharging path includes a transformer, so that the charging path and the discharging path of the photovoltaic energy storage system can be shortened, thereby improving charging and discharging efficiency of a cell.

In the photovoltaic energy storage system provided in Embodiment 3, the energy storage converter may be divided into an independent DC/DC power conversion device and an independent DC/AC power conversion device. For details, refer to FIG. 9A and FIG. 9B.

Embodiment 4 provides another photovoltaic energy storage system. The photovoltaic energy storage system includes M cell strings, N direct current/alternating current DC/DC power conversion devices, at least one DC/AC power conversion device, X photovoltaic strings, and Y photovoltaic inverters, a first end of any one of the N DC/DC power conversion devices is coupled to at least one of the M cell strings, a second end of the any DC/DC power conversion device is coupled to a first end of one of the at least one DC/AC power conversion device, a second end of the DC/AC power conversion device is configured to connect to a power grid, an input end of any one of the Y photovoltaic inverters is coupled to an output end of at least one of the X photovoltaic strings, output ends of the Y photovoltaic inverters are coupled to a second end of the at least one DC/AC power conversion device, X and Y are integers greater than 0, M and N are integers greater than 0, and M≥N.

Figure 9B:
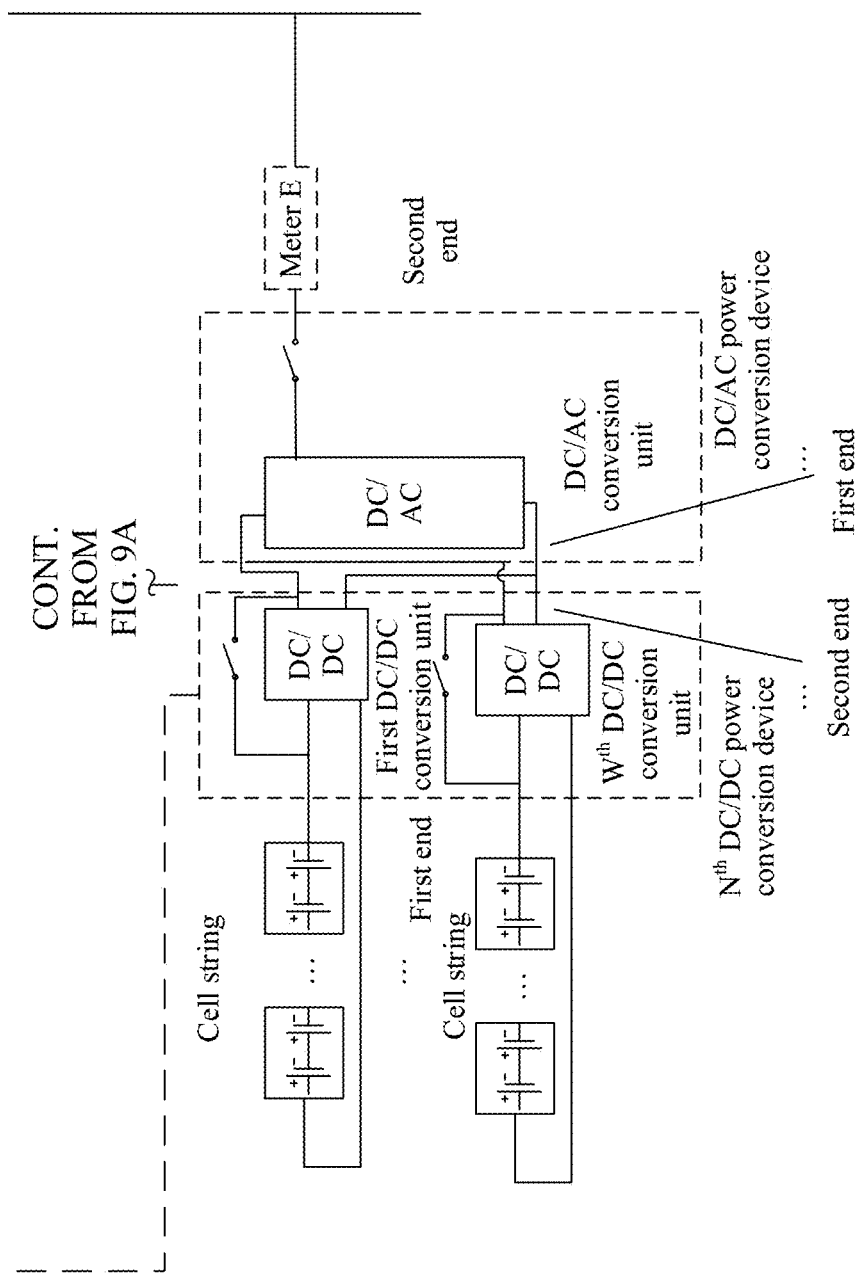

In FIG. 9A and FIG. 9B, there are N power conversion devices from a first DC/DC power conversion device to an $N^{th}$ DC/DC power conversion device, and there is at least one DC/AC power conversion device. The first DC/DC power conversion device is any one of the N DC/DC power conversion devices, and a first DC/AC power conversion device is one of the at least one DC/AC power conversion device.

A first end of the first DC/DC power conversion device is coupled to Q cell strings in the M cell strings, and the first DC/DC power conversion device includes at least one DC/DC conversion unit. (FIG. 9A and FIG. 9B use an example in which the first DC/DC power conversion device includes a first DC/DC conversion unit and a second DC/DC power conversion unit, but is not limited thereto.) Q is an integer greater than 0, and Q≤M.

Any DC/DC conversion unit in the first DC/DC power conversion device is coupled to at least one of the Q cell strings by using the first end of the first DC/DC power conversion device. (FIG. 9A and FIG. 9B use an example in which the first DC/DC conversion unit is coupled to a first cell string by using the first end of the first DC/DC power conversion device and a $W^{th}$ DC/DC conversion unit is connected to a $Q^{th}$ cell string by using the first end of the first energy storage converter.)

Any DC/DC conversion unit in the first DC/DC power conversion device is coupled to a first end of one of the at least one DC/AC power conversion device by using a second end of the first DC/DC power conversion device. (FIG. 9A and FIG. 9B use an example in which both the first DC/DC conversion unit and the W' DC/DC conversion unit are connected to the first end of the first DC/AC power conversion device by using the second end of the first DC/DC power conversion device.)

The DC/DC conversion unit in the photovoltaic energy storage system is configured to perform adaptation between a voltage of a DC/AC conversion unit and a voltage of a cell string. (As shown in FIG. 9A and FIG. 9B, the first DC/DC conversion unit in the photovoltaic energy storage system is configured to perform adaptation between the voltage of the DC/AC conversion unit and a voltage of the first cell string, and the $W^{th}$ DC/DC conversion unit is configured to perform adaptation between the voltage of the DC/AC conversion unit and a voltage of the $Q^{th}$ cell string.) Therefore, a cell capacity can be fully used, and a waste of the cell capacity can be reduced.

In addition, in the photovoltaic energy storage system, a charging path and a discharging path do not include a transformer, so that the charging path and the discharging path of the photovoltaic energy storage system can be shortened, thereby improving charging and discharging efficiency of a cell It should be noted that in the photovoltaic energy storage system, a positive port of each DC/DC conversion unit is coupled to a positive port of a cell string, and a negative port of each DC/DC conversion unit is connected to a negative port of the cell string.

The photovoltaic energy storage system further includes a first transformer, and a second end of the at least one DC/AC power conversion device included in the photovoltaic energy storage system is coupled to the power grid by using the first transformer. (FIG. 9A and FIG. 9B use only an example in which a second end of the first DC/AC power conversion device is connected to the power grid by using the first transformer.) The first transformer may perform adaptation between an output voltage of the DC/AC power conversion device and a voltage of the power grid, so that electric energy of the photovoltaic energy storage system can be transported to the power grid, or the photovoltaic energy storage system can store electric energy of the power grid.

In the photovoltaic energy storage system, both ends of any DC/DC conversion unit may be further connected in parallel to a switch. (Both ends of each of the first DC/DC conversion unit and the $W^{th}$ DC/DC conversion unit in FIG. 9A and FIG. 9B are connected in parallel to a switch.) If a voltage of the cell string and a voltage of the DC/AC power conversion device are adaptable, the switch connected in parallel to both ends of the DC/DC conversion unit may be closed, so that the DC/DC conversion unit can be short-circuited. In this way, unnecessary energy consumption can be reduced. If a voltage of the cell string and a voltage of the DC/AC power conversion device are not adaptable, the switch connected in parallel to both ends of the DC/DC conversion unit is open, and the DC/DC conversion unit performs adaptation between the voltage of the cell string and the voltage of the DC/AC power conversion device.

It should be noted that a control module may be disposed in the DC/DC power conversion device in the energy storage system, and the control module may monitor a voltage of a cell string connected to the DC/DC power conversion device. The DC/DC power conversion device is configured to detect the voltage of the cell string connected to the DC/DC power conversion device. For example, in FIG. 9A and FIG. 9B, the first DC/DC power conversion device may detect voltages of the Q cell strings connected to the first DC/DC power conversion device. When a voltage of any one of the Q cell strings is greater than or equal to a first voltage threshold, a switch connected in parallel to a DC/DC conversion unit coupled to the cell string whose voltage is greater than or equal to the first voltage threshold is closed; and when a voltage of any one of the Q cell strings is less than or equal to a second voltage threshold, a switch connected in parallel to a DC/DC conversion unit whose voltage is less than or equal to the second voltage threshold is open. The first voltage threshold is greater than or equal to the second voltage threshold. The first voltage threshold and the second voltage threshold are related to a voltage value of the power grid and a current value of an output end.

The energy storage system may further include a controller, the controller is coupled to each of the Y photovoltaic inverters, the controller is coupled to each of the N DC/DC power conversion devices, and the controller is configured to communicate with the Y photovoltaic inverters and the N DC/DC power conversion devices. (FIG. 9A and FIG. 9B use an example in which the controller is connected to a first photovoltaic inverter and the first DC/DC power conversion device.) The controller may communicate with the Y photovoltaic inverters and the N DC/DC power conversion devices, so that the controller can detect power generation statuses of the X photovoltaic strings by using the Y photovoltaic inverters, and can detect quantities of electricity of the M cell strings by using the N DC/DC power conversion devices. Specifically, the controller may communicate with control modules in the Y photovoltaic inverters and control modules in the N DC/DC power conversion devices.

The controller may receive, through a cable or wirelessly, real-time grid feed-in power delivered by a power grid corporation or an optical power storage station, and detect total power of the Y photovoltaic inverters. When the controller detects that the total power of the Y photovoltaic inverters is greater than or equal to the grid feed-in power, the controller controls the N DC/DC power conversion devices to charge the M cell strings; and when the controller detects that the total power of the Y photovoltaic inverters is less than the grid feed-in power, the controller controls, by using the N DC/DC power conversion devices, the M cell strings to discharge. When the controller detects that the total power of the Y photovoltaic inverters is greater than or equal to the grid feed-in power, it indicates that the total output power of the Y photovoltaic inverters is excessively high, energy generated by the Y photovoltaic inverters may be stored, and the controller may control the N energy storage converters to charge the M cell strings. When the controller detects that the total output power of the Y photovoltaic inverters is less than the grid feed-in power, the controller may control, by using the N energy storage converters, the M cell strings to discharge, to compensate for a shortage of the output power of the photovoltaic inverters.

When an output voltage frequency of any one of the N DC/DC power conversion devices or the Y photovoltaic inverters is greater than a first preset voltage frequency threshold, each of the Y photovoltaic inverters performs output with reduced power based on a preset power curve of the photovoltaic inverter, and the N DC/DC power conversion devices charge the M cell strings; and when an output end voltage frequency of any one of the N DC/DC power conversion devices or the Y photovoltaic inverters is less than a second preset voltage frequency threshold, each of the Y photovoltaic inverters performs output with increased power based on a preset power curve of the photovoltaic inverter, and the N DC/DC power conversion devices control the M cell strings to discharge. The first preset voltage frequency threshold is greater than a preset power grid voltage normal frequency value, and the second preset voltage frequency threshold is less than the preset power grid voltage normal frequency value. In this way, power of the photovoltaic inverter can fall within a normal range.

The controller is further configured to obtain a quantity of electricity of each of the M cell strings by using the N DC/DC power conversion devices; when the N DC/DC power conversion devices charge the M cell strings, the controller controls the N DC/DC power conversion devices to preferentially charge a cell string with a small quantity of electricity in the M cell strings; and when the M cell strings discharge, the controller preferentially controls, by using the N DC/DC power conversion devices, a cell string with a large quantity of electricity in the M cell strings to discharge. In this way, the cell string with a small quantity of electricity can be preferentially charged, and the cell string with a large quantity of electricity can preferentially discharge, so that quantities of electricity of all of the cell strings can be kept balanced to the greatest extent.

The energy storage system further includes a meter, the meter is configured to connect to second ends of the N DC/DC power conversion devices, and the meter is configured to measure amount of charging electricity and amount of discharging electricity of the N DC/DC power conversion devices. Specifically, in FIG. 9A and FIG. 9B, a meter C is connected to the second end of the first DC/AC power conversion device, and may measure amount of charging electricity and amount of discharging electricity of the Q cell strings connected to the first DC/DC power conversion device. It should be noted that the meter may be alternatively directly disposed on a second end of the DC/DC power conversion device. An output end of the first photovoltaic inverter is connected to a meter A, and the meter A may measure a power yield of a photovoltaic string corresponding to the first photovoltaic inverter. An output end of the $Y^{th}$ photovoltaic inverter may be connected to a meter B, and the meter B may measure a power yield of a photovoltaic string corresponding to the $Y^{th}$ photovoltaic inverter. In the energy storage system, a location at which the meter is disposed is not limited. A meter may be connected to a second end of each energy storage converter to measure an amount of charging electricity and an amount of discharging electricity of the energy storage converter, or only one meter may be disposed to measure amount of charging electricity and amount of discharging electricity of all energy storage converters.

Refer to FIG. 9A and FIG. 9B. In the photovoltaic energy storage system, one DC/DC conversion unit may be connected to one or more cell strings. Optimally, the one DC/DC conversion unit may be connected to only one cell string. If a DC/DC conversion unit is connected to a plurality of cell strings connected in parallel, a consistency requirement for the cell strings connected in parallel is relatively high. When the DC/DC conversion unit is connected to only one cell string, consistency of the cell string is relatively low.

A second end of the DC/AC power conversion device in the photovoltaic energy storage system may be coupled to the power grid by using a transformer. A low-voltage winding of the transformer is connected to the photovoltaic inverter and the energy storage converter, and a high-voltage winding of the transformer is connected to the power grid. A voltage of the power grid may be a three-phase alternating current of 10 kV, 35 kV, and 110 kV, and an output end voltage of the low-voltage winding may be an alternating current voltage of 0.4 kV, 0.48 kV, 0.6 kV, and 0.8 kV.

Optionally, in the energy storage converter in the photovoltaic energy storage system, the DC/DC conversion unit may be connected in series to a switch, and is connected to a cell string by using a first end of the DC/DC power conversion device; and the DC/AC conversion unit may be connected in series to a switch, and may be connected to a low-voltage winding by using the DC/AC power conversion device and the first transformer.

Figure 10A:
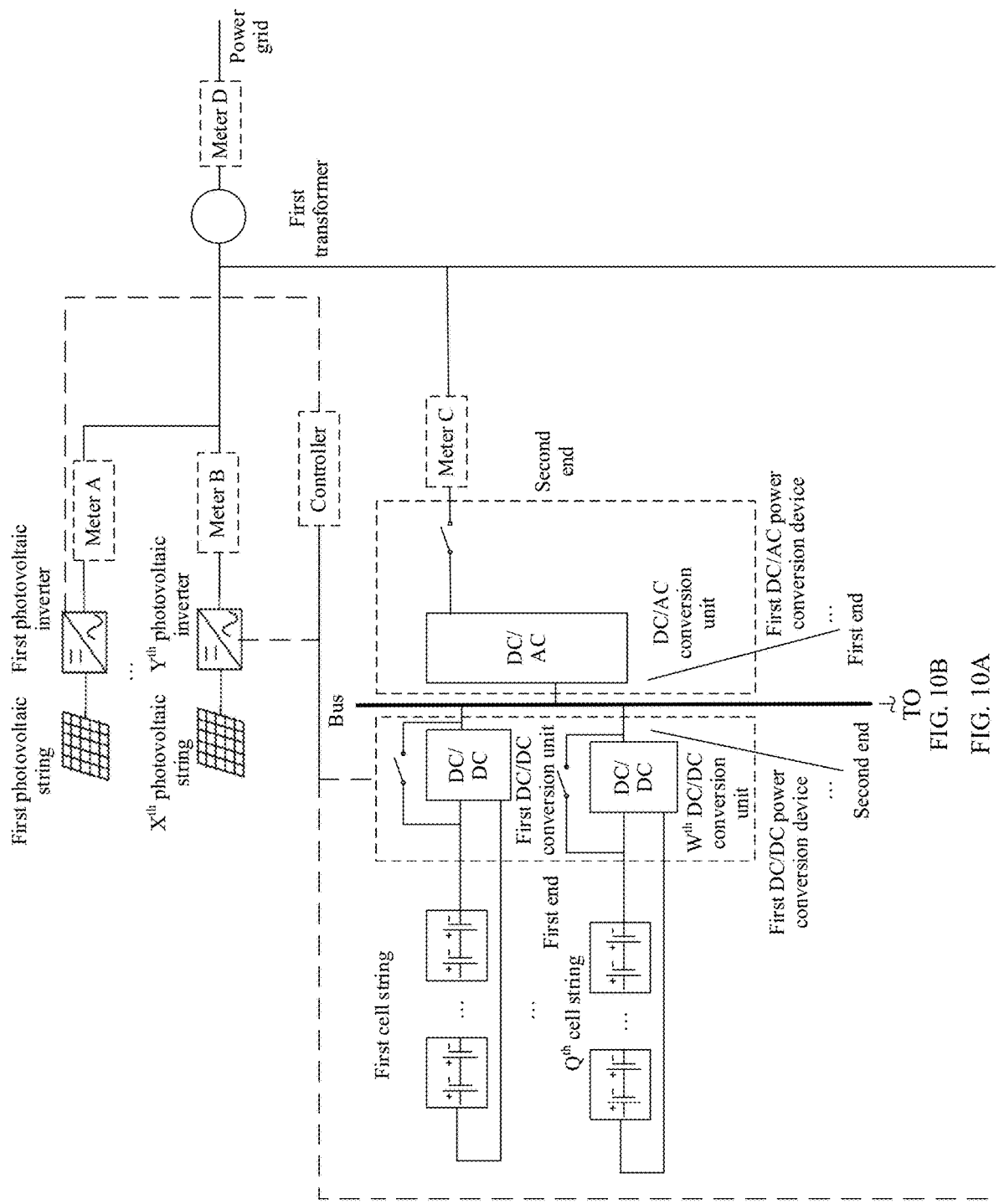
FIG. 10A and FIG. 10B are a schematic diagram of an embodiment of a photovoltaic energy storage system according to this application.
Figure 10B:
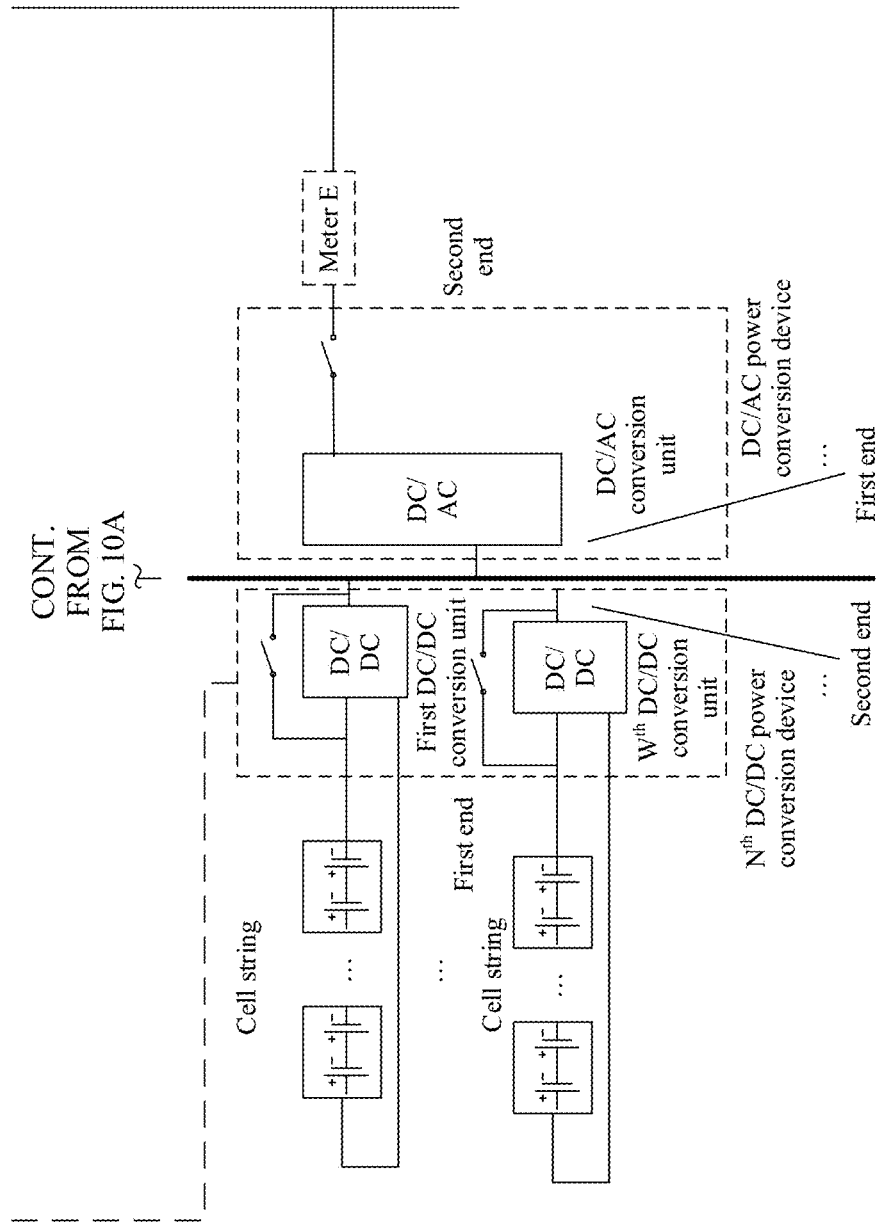

In an implementation, the N DC/DC power conversion devices in the photovoltaic energy storage system may be connected to the at least one DC/AC power conversion device through a bus. Each of the N DC/DC power conversion devices and the at least one DC/AC power conversion device may be connected to the bus by using a switch. For details, refer to FIG. 10A and FIG. 10B for understanding. Details are not described herein.

The energy storage converter described in Embodiment 4 may be a string direct current energy storage converter, a string alternating current energy storage converter, a two-stage string energy storage converter, a string PCS, a two-stage PCS, or a DC/AC PCS.

Embodiment 4 provides a photovoltaic energy storage system. The photovoltaic energy storage system includes M cell strings, N direct current/alternating current DC/DC power conversion devices, at least one DC/AC power conversion device, X photovoltaic strings, and Y photovoltaic inverters, a first end of any one of the N DC/DC power conversion devices is coupled to at least one of the M cell strings, a second end of the any DC/DC power conversion device is coupled to a first end of one of the at least one DC/AC power conversion device, a second end of the DC/AC power conversion device is configured to connect to a power grid, an input end of any one of the Y photovoltaic inverters is coupled to an output end of at least one of the X photovoltaic strings, output ends of the Y photovoltaic inverters are coupled to a second end of the at least one DC/AC power conversion device, X and Y are integers greater than 0, M and N are integers greater than 0, and M≥N; a first end of a first DC/DC power conversion device is coupled to Q cell strings in the M cell strings, the first DC/DC power conversion device includes at least one DC/DC conversion unit, the first DC/DC power conversion device is any one of the N DC/DC power conversion devices, Q is an integer greater than 0, and Q≤M; a first DC/DC conversion unit is coupled to at least one of the Q cell strings by using the first end of the first DC/DC power conversion device, the first DC/DC conversion unit is coupled to a first end of one of the at least one DC/AC power conversion device by using a second end of the first DC/DC power conversion device, and the first DC/DC conversion unit is any one of the at least one DC/DC conversion unit; and the first DC/DC conversion unit is configured to perform adaptation between a voltage of one of the at least one DC/AC power conversion device and a voltage of at least one of the Q cell strings.

The DC/DC conversion unit in the photovoltaic energy storage system may perform adaptation between a voltage of a DC/AC conversion unit and a voltage of a cell string, so that a cell capacity can be fully used, and a waste of the cell capacity can be reduced. In addition, in the photovoltaic energy storage system, neither the charging path nor the discharging path includes a transformer, so that the charging path and the discharging path of the photovoltaic energy storage system can be shortened, thereby improving charging and discharging efficiency of a cell.

It should be noted that the energy storage converter described in the foregoing embodiments may be a string direct current energy storage converter, a string alternating current energy storage converter, a two-stage string energy storage converter, a string PCS, a two-stage PCS, or a DC/AC PCS. The energy storage converter may be an independent device described in Embodiment 1 and Embodiment 3, or may be formed through coupling between one independent DC/DC power conversion device and one independent DC/AC power conversion device described in Embodiment 2 and Embodiment 4. This is not limited herein.

The energy storage system and the photovoltaic energy storage system provided in the embodiments of the present disclosure are described in detail above. The principle and implementation of the present disclosure are described herein through specific examples. The description about the embodiments is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as any limitation on the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An energy storage converter, wherein a first end of the energy storage converter is coupled to at least one of Q cell strings, a second end of the energy storage converter is configured to connect to a power grid, and Q is an integer greater than 0;
    the energy storage converter comprises a direct current to alternating current (DC to AC) conversion unit and at least one direct current to direct current (DC to DC) conversion unit; and
    a first DC to DC conversion unit is coupled to the at least one of the Q cell strings using the first end of the energy storage converter, the first DC to DC conversion unit is coupled to the DC to AC conversion unit, the DC to AC conversion unit is coupled to the power grid by using the second end of the energy storage converter, and the first DC to DC conversion unit is any one of the at least one DC to DC conversion unit, wherein
    the first DC to DC conversion unit is configured to perform adaptation between a voltage of the DC t AC conversion unit and a voltage of the at least one of the Q cell strings, and
    wherein both ends of any one of the at least one DC to DC conversion unit are connected in parallel to a switch, and the energy storage converter is configured to detect voltages of the at least one of the Q cell strings, and in response to a voltage of any one of the at least one of the Q cell strings being greater than or equal to a first voltage threshold, a switch connected in parallel to a DC to DC conversion unit coupled to the cell string whose voltage is greater than or equal to the first voltage threshold is closed; and
        in response to a voltage of any one of the at least one of the Q cell strings being less than or equal to a second voltage threshold, a switch connected in parallel to a DC to DC conversion unit coupled to the cell string whose voltage is less than or equal to the second voltage threshold is open, wherein the first voltage threshold is greater than or equal to the second voltage threshold.

2. The energy storage converter according to claim 1, wherein the second end of the energy storage converter is coupled to the power grid using a first transformer.

3. The energy storage converter according to claim 1, wherein the second end of the energy storage converter is coupled to output ends of Y photovoltaic inverters, Y is an integer greater than 0.

4. The energy storage converter according to claim 3, wherein the energy storage converter further comprises a controller, the controller is coupled to each of the Y photovoltaic inverters, and the controller is configured to communicate with the Y photovoltaic inverters.

5. The energy storage converter according to claim 4, wherein the controller is further configured to obtain grid feed-in power, and when the controller detects that total power of the Y photovoltaic inverters is greater than or equal to the grid feed-in power, the controller controls the energy storage converter to charge the at least one of the Q cell strings; and
    in response to the controller detecting that the total power of the Y photovoltaic inverters is less than the grid feed-in power, the controller controls the at least one of the Q cell strings to discharge.

6. The energy storage converter according to claim 4, wherein in response to an output voltage frequency of the energy storage converter or the Y photovoltaic inverters being greater than a first preset voltage frequency threshold, each of the Y photovoltaic inverters performs output with reduced power based on a preset power curve of the photovoltaic inverter, and the energy storage converter charges the at least one of the Q cell strings; and
    in response to an output end voltage frequency of any one of the energy storage converter or the Y photovoltaic inverters being less than a second preset voltage frequency threshold, each of the Y photovoltaic inverters performs output with increased power based on a preset power curve of the photovoltaic inverter, and the energy storage converter controls the at least one of the Q cell strings to discharge, wherein the first preset voltage frequency threshold is greater than a preset power grid voltage normal frequency value, and the second preset voltage frequency threshold is less than the preset power grid voltage normal frequency value.

7. The energy storage converter according to claim 4, wherein the controller is configured to obtain a quantity of electricity of each of the at least one of the Q cell strings;
    in response to the energy storage converter charging the at least one of the Q cell strings, the controller controls the energy storage converter to preferentially charge a cell string with a small quantity of electricity in the at least one of the Q cell strings; and
    in response to the at least one of the Q cell strings discharging, the controller preferentially controls a cell string with a large quantity of electricity in the at least one of the Q cell strings to discharge.

8. The energy storage converter according to claim 1, wherein any one of the at least one DC to DC conversion unit is coupled to the at least one of the Q cell strings.

9. A direct current to direct current (DC to DC) power conversion device, wherein a first end of the DC to DC power conversion device is coupled to at least one of Q cell strings, a second end of the DC to DC power conversion device is coupled to a first end of a direct current to alternating current (DC to AC) power conversion device, and Q is an integer greater than 0;
    the DC to DC power conversion device comprises at least one DC to DC conversion unit;
    a first DC to DC conversion unit is coupled to the at least one of the Q cell strings using the first end of the DC to DC power conversion device, the first DC to DC conversion unit is coupled to the first end of the DC to AC power conversion device using the second end of the DC to DC power conversion device, and the first DC to DC conversion unit is any one of the at least one DC to DC conversion unit; and
the first DC to DC conversion unit is configured to perform adaptation between a voltage of the DC to AC power conversion device and a voltage of the at least one of the q cell strings, and
wherein both ends of any one of the at least one DC to DC conversion unit are connected in parallel to a switch, and the energy storage converter is configured to detect voltages of the at least one of the Q cell strings, and in response to a voltage of any one of the at least one of the Q cell strings being greater than or equal to a first threshold, a switch connected in parallel to a DC to DC conversion unit coupled to the cell string whose voltage is greater than or equal to the first voltage threshold is closed; and
in response to a voltage of any one of the at least one of the Q cell strings being less than or equal to a second voltage threshold, a switch connected in parallel to a DC to DC conversion unit coupled to the cell string whose voltage is less than or equal to the second voltage threshold is open, wherein the first voltage threshold is greater than or equal to the second voltage threshold.

10. The DC to DC power conversion device according to claim 9, wherein the DC to DC power conversion device further comprises a controller, the controller is coupled to each of Y photovoltaic inverters, and the controller is configured to communicate with the Y photovoltaic inverters, wherein Y is an integer greater than 0.

11. The DC to DC power conversion device according to claim 10, wherein the controller is further configured to obtain grid feed-in power, and in response to the controller detecting that total power of the Y photovoltaic inverters is greater than or equal to the grid feed-in power, the controller controls the DC to DC power conversion device to charge the at least one of the Q cell strings; and
in response to the controller detecting that the total power of the Y photovoltaic inverters is less than the grid feed-in power, the controller controls the at least one of the Q cell strings to discharge.

12. The DC to DC power conversion device according to claim 10, wherein response to an output voltage frequency of the DC to DC power conversion device or the Y photovoltaic inverters being greater than a first preset voltage frequency threshold, each of the Y photovoltaic inverters performs output with reduced power based on a preset power curve of the photovoltaic inverter, and the DC to DC power conversion device charges the at least one of the Q cell strings; and
in response to an output end voltage frequency of the DC to DC power conversion device or the Y photovoltaic inverters being less than a second preset voltage frequency threshold, each of the Y photovoltaic inverters performs output with increased power based on a preset power curve of the photovoltaic inverter, and the DC to DC power conversion device controls the at least one of the Q cell strings to discharge, wherein the first preset voltage frequency threshold is greater than a preset power grid voltage normal frequency value, and the second preset voltage frequency threshold is less than the preset power grid voltage normal frequency value.

13. The DC to DC power conversion device according to claim 12, wherein the controller is further configured to obtain a quantity of electricity of each of the at least on of the Q cell strings;
in response to the DC to DC power conversion device charging the at least one of the Q cell strings, the controller controls the DC to DC power conversion device to preferentially charge a cell string with a small quantity of electricity in the at least one of the Q cell strings; and
in response to the at least one of the Q cell strings discharging, the controller preferentially controls a cell string with a large quantity of electricity in the at least one of the Q cell strings to discharge.

14. The DC to DC power conversion device according to claim 9, wherein any one of the at least one DC to DC conversion unit is coupled to the at least one of the Q cell strings.

* * * * *

UNITED STATES PATENT AND TRADEMARK OFFICE
CERTIFICATE OF CORRECTION

| | | |
|---|---|---|
| PATENT NO. | : 12,322,975 B2 | Page 1 of 1 |
| APPLICATION NO. | : 18/397752 | |
| DATED | : June 3, 2025 | |
| INVENTOR(S) | : Zhang et al. | |

It is certified that error appears in the above-identified patent and that said Letters Patent is hereby corrected as shown below:

On the Title Page

(57) Abstract: Cancel text beginning with "The present disclosure discloses an energy storage con-" and insert the following abstract:
-- The present disclosure discloses an energy storage converter. A first end of the energy storage converter is coupled to at least one of Q cell strings, and a second end of the energy storage converter is configured to connect to a power grid. The energy storage converter includes a direct current/alternating current (DC/AC) conversion unit and at least one direct current/direct current (DC/DC) conversion unit. The at least one DC/DC conversion unit is configured to perform adaptation between a voltage of the DC/AC conversion unit and a voltage of the at least one of the cell strings. --.

In the Claims

Claim 1: Column 35, Line 40: "perform adaptation between a voltage of the DC t AC" should read as -- perform adaptation between a voltage of the DC to AC --.

Claim 9: Column 37, Line 6: "one of the q cell strings, and" should read as -- one of the Q cell strings, and --.

Claim 9: Column 37, Line 13: "threshold, a switch connected in parallel to a DC to DC" should read as -- voltage threshold, a switch connected in parallel to a DC to DC --.

Claim 12: Column 38, Line 2: "claim 10, wherein response to an output voltage frequency" should read as -- claim 10, wherein in response to an output voltage frequency --.

Claim 13: Column 38, Line 24: "obtain a quantity of electricity of each of the at least on of" should read as -- obtain a quantity of electricity of each of the at least one of --.

Signed and Sealed this
Twenty-fifth Day of November, 2025

John A. Squires
*Director of the United States Patent and Trademark Office*